United States Patent
Yamamoto et al.

(10) Patent No.: US 8,622,827 B2
(45) Date of Patent: Jan. 7, 2014

(54) GAME SYSTEM AND CONTROL METHOD OF CONTROLLING COMPUTER USED THEREOF

(75) Inventors: Takao Yamamoto, Tokyo (JP); Masahiro Kiyomoto, Tokyo (JP); Shota Katagiri, Tokyo (JP); Yoshitaka Nishimura, Tokyo (JP)

(73) Assignee: Konami Digital Entertainment Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/643,283

(22) PCT Filed: Apr. 27, 2011

(86) PCT No.: PCT/JP2011/060328
§ 371 (c)(1),
(2), (4) Date: Oct. 24, 2012

(87) PCT Pub. No.: WO2011/136304
PCT Pub. Date: Nov. 3, 2011

(65) Prior Publication Data
US 2013/0040734 A1   Feb. 14, 2013

(30) Foreign Application Priority Data

Apr. 28, 2010   (JP) .................................. 2010-104539

(51) Int. Cl.
*A63F 13/00*   (2006.01)
(52) U.S. Cl.
USPC .......................................................... 463/31
(58) Field of Classification Search
USPC ................................. 463/7, 31, 37
See application file for complete search history.

(56) References Cited

U.S. PATENT DOCUMENTS

| | | | |
|---|---|---|---|
| 7,052,392 B2 * | 5/2006 | Tessmer et al. | 463/16 |
| 8,282,457 B1 * | 10/2012 | Edwards | 463/7 |
| 8,348,761 B2 * | 1/2013 | Nakatsuka et al. | 463/37 |

(Continued)

FOREIGN PATENT DOCUMENTS

| | | | |
|---|---|---|---|
| JP | 2000-155543 A | 6/2000 |
| JP | 2003-236243 A | 8/2003 |
| JP | 3577273 B2 | 10/2004 |

OTHER PUBLICATIONS

International Search Report (date of mailing Aug. 9, 2011).

(Continued)

*Primary Examiner* — William Brewster
*Assistant Examiner* — Jason Skaarup
(74) *Attorney, Agent, or Firm* — Howard & Howard Attorneys PLLC

(57) ABSTRACT

Disclosed is a game system provided with a monitor for displaying and outputting a game screen, a touch panel overlaid upon the monitor, and an external storage device for storing sequence data wherein operation time periods of the touch panel during a game are described. The sequence data includes an object corresponding to a specific operation time period for which the time interval between the following operation time period is to be less than a predetermined value, and display start information for setting a display start time period which is earlier than the following operation time period. In addition, the game system, on the basis of the sequence data, associates a second object separate from a first object corresponding to the following operation time period with the specific operation time period to cause display to start earlier than the following operation time period.

9 Claims, 24 Drawing Sheets

(56) References Cited

U.S. PATENT DOCUMENTS

| | | | |
|---|---|---|---|
| 8,371,940 B1* | 2/2013 | Robinson et al. | 463/39 |
| 8,409,005 B2* | 4/2013 | Nakano et al. | 463/37 |
| 8,414,395 B2* | 4/2013 | Oberg et al. | 463/37 |
| 8,419,516 B2* | 4/2013 | Masuda et al. | 463/7 |
| 2006/0058101 A1* | 3/2006 | Rigopulos | 463/35 |
| 2007/0232374 A1* | 10/2007 | Lopiccolo et al. | 463/7 |
| 2008/0200224 A1* | 8/2008 | Parks | 463/7 |
| 2008/0280680 A1* | 11/2008 | Dutilly et al. | 463/36 |
| 2008/0311969 A1* | 12/2008 | Kay et al. | 463/7 |
| 2008/0311970 A1* | 12/2008 | Kay et al. | 463/7 |
| 2009/0075711 A1* | 3/2009 | Brosius et al. | 463/7 |
| 2009/0104956 A1* | 4/2009 | Kay et al. | 463/7 |
| 2009/0258686 A1* | 10/2009 | McCauley et al. | 463/7 |
| 2009/0258702 A1* | 10/2009 | Flores et al. | 463/35 |
| 2009/0258705 A1* | 10/2009 | Guinchard et al. | 463/37 |
| 2009/0291756 A1* | 11/2009 | McCauley et al. | 463/31 |
| 2009/0310027 A1* | 12/2009 | Fleming | 348/706 |
| 2010/0009749 A1* | 1/2010 | Chrzanowski et al. | 463/35 |
| 2010/0009750 A1* | 1/2010 | Egozy et al. | 463/35 |
| 2010/0029386 A1* | 2/2010 | Pitsch et al. | 463/35 |
| 2010/0087240 A1* | 4/2010 | Egozy et al. | 463/7 |
| 2010/0137049 A1* | 6/2010 | Epstein | 463/7 |
| 2010/0184497 A1* | 7/2010 | Cichowlas | 463/7 |
| 2010/0257993 A1* | 10/2010 | Brow et al. | 84/478 |
| 2011/0009191 A1* | 1/2011 | Naidenov | 463/35 |
| 2011/0053688 A1* | 3/2011 | Crawford et al. | 463/31 |
| 2011/0207513 A1* | 8/2011 | Cross et al. | 463/7 |

OTHER PUBLICATIONS

Chinese Office Action with English Translation (Issued Apr. 3, 2013).

* cited by examiner

GAME SYSTEM AND CONTROL METHOD OF CONTROLLING COMPUTER USED THEREOF

CROSS REFERENCE TO RELATED APPLICATION

This application is a national stage application of PCT/JP2011/060328, filed Apr. 27, 2011, which claims priority to Japanese Patent Application No. 2010-104539, filed Apr. 28, 2010, the disclosures of which are hereby incorporated by reference in their entirety.

TECHNICAL FIELD

The present invention relates to a game system in which an operation timing of an operating unit provided in an input device is indicated to a player, and a control method of controlling a computer used thereof.

BACKGROUND ART

There are game machines in which a plurality of players alternately operates an operating unit in tune with a rhythm of music. Of the game machines, there has been known a game machine in which a plurality of players play a game, and each player alternately operates the operating unit while deciding a next player to operate an operating unit through an operation of the operating unit (for example, see Patent Literature 1). Further, there has been known a game machine in which a game is played such that two players alternately hit back an object indicating an operation timing, and the velocity of the object moving toward the other party side changes according to the position of the object at a point in time when each player hits the object back (for example, see Patent Literature 2).
Patent Literature 1: Japanese Patent Application Laid-Open (JP-A) No. 2003-236243 and
Patent Literature 2: JP-A No. 2000-155543.

SUMMARY OF INVENTION

Technical Problem

In the game machine disclosed in Patent Literature 1, a difference between an entering timing at which a light shot serving as an operation indication mark indicating an operation of an operating unit enters a control area of each player and an operation timing of each player is evaluated. In the game machine disclosed in Patent Literature 1, a back ground music (BGM) is mainly used as a playing time. Meanwhile, in the game machine disclosed in Patent Literature 2, an operation performed in tune with a rhythm of music is evaluated, but a time on music is not associated with an arrival timing of an object serving as an operation indication mark. For this reason, in this game machine, an interval between a certain operation timing and a next operation timing does not become short according to the progress of music. Meanwhile, when a time on music is associated with an operation timing, there are cases in which an interval between a certain operation timing and a next operation timing becomes short according to the progress of music. In this case, a moving time of an operation indication mark is short, and thus a moving velocity of an operation indication mark may be too fast to be appropriate for an indication of an operation timing.

In this regard, it is an object of the present invention is to provide a game system and a control method used thereof, which are capable of preventing the moving velocity of the operation indication mark from becoming too fast.

Solution to Problem

A game system according to a first embodiment of the present invention comprises: a display device that displays and outputs a game screen; an input device including a plurality of operating units; a sequence data storage device that stores sequence data in which an operation timing on each of the plurality of operating units during a game is described in association with information indicating any one of the plurality of operating units; a game region presenting device that causes a game region in which a plurality of operation reference portions respectively corresponding to the plurality of operating units are set apart from each other to be displayed on a screen of the display device; and a mark display control device that displays an operation indication mark for indicating an operation on the operating unit while moving the operation indication mark in the game region such that the operation indication mark arrives at an operation reference portion corresponding to an operating unit associated with an operation timing indicated by the sequence data at the operation timing, wherein the sequence data further includes display start information setting a display start timing of an operation indication mark corresponding to a next operation timing next to a certain operation timing to a timing earlier than the certain operation timing when a time interval between the certain operation timing and the next operation timing is less than a predetermined value, and the mark display control device starts to display an operation indication mark separate from the operation indication mark corresponding to the certain operation timing at the display start timing based on the sequence data as the operation indication mark corresponding to the next operation timing.

According to the first embodiment of the present invention, when an interval between a certain operation timing and a next operation timing is less than a predetermined value, it is possible to start a display of an operation indication mark corresponding to the next operation timing at a timing earlier than the certain operation timing separately from an operation indication mark corresponding to the certain operation timing. Thus, when a time interval between operation timings is short, a plurality of operation indication marks are displayed before the certain operation timing, a moving time of an operation indication mark corresponding to the next operation timing having a short time interval increases to be larger than when an operation timing is indicated by only one operation indication mark. Thus, even when a time interval between operation timings is short, a moving velocity of an operation indication mark can be prevented from becoming too fast.

In an aspect of the game system according to the first embodiment of the present invention, a timing matching a display start timing of an operation indication mark corresponding to an operation timing before the certain operation timing may be set to the display start information of the sequence data as the display start timing of the operation indication mark corresponding to the next operation timing. In this case, the operation indication mark corresponding to the operation timing next to the certain operation timing can start to be displayed at the same time as an operation indication mark corresponding to an operation timing before the certain operation timing. As a result, the moving time of the operation indication mark corresponding to the next operation timing can be sufficiently secured, and natural appearance of the operation indication mark can be rendered.

Further, in an aspect of the game system according to the first embodiment of the present invention, in the display start information of the sequence data, in addition to the time interval between the certain operation timing and the next operation timing, when a time interval between the certain operation timing and a previous operation timing which is earlier than the certain operation timing is less than the predetermined value, all display start timings of operation indication marks respectively corresponding to three operation timings of the next operation timing, the certain operation timing, and the previous operation timing may be set to match a display start timing of the previous operation timing. In this case, it is possible to sufficiently secure the moving times of the operation indication marks corresponding to the certain operation timing and the next operation timing, and it is possible to display the operation indication marks at the same time as the operation indication mark corresponding to the previous operation timing, and thus, natural appearance of the operation indication marks can be rendered.

Various input devices may be used as the input device. For example, in an aspect of the game system according to the first embodiment of the present invention, a touch panel arranged on the display device so as to cover the game region may be used as the input device.

The game region may have various shapes. For example, in an aspect of a game system according to a first embodiment of the present invention, the game region presenting device may cause a region which is formed in the form of a quadrangle, and includes two operation reference portions extending in the form of a straight line which are set at both one ends of the quadrangle so as to face with each other to be displayed on the screen of the display device as the game region. In this case, for example, it is possible to actualize a game of a match-up type in which two players respectively corresponding to the operation reference portions at both ends of the quadrangle execute an operation at an appropriate timing based on an operation indication mark moving at an appropriate velocity.

In an aspect of the game system according to the first embodiment of the present invention, the game system may further comprises an evaluating device that evaluates an operation in at least one operating unit based on a timing of an operation on the operating unit and an operation timing designated by the sequence data. In this case, a timing of an operation on each operating unit can be evaluated based on an operation timing described in the sequence data. Thus, amusement of the game can be improved.

In an aspect of the game system according to the first embodiment of the present invention, the game system may further comprises: an audio output device that reproduces and outputs a sound; a music data storage device that stores music data used to reproduce music; and a music reproducing device that reproduces the music through the audio output device based on the music data, and wherein an operation timing of each of the plurality of operating units during reproduction of the music may be described in the sequence data. In this case, it is possible to actualize a music game in which the operation indication mark moves between the operation reference portions so as to arrive at the operation reference portion corresponding to the operation timing at the operation timing corresponding to a rhythm of music, and when an interval between the operation timings is short, a plurality of operation indication marks are displayed in advance so that the moving velocity of the operation indication mark does not become too fast.

A control method of controlling a computer of the present invention is a control method of controlling a computer incorporated into a game system comprising: a display device that displays and outputs a game screen; an input device including a plurality of operating units; a sequence data storage device that stores sequence data in which an operation timing on each of the plurality of operating units during a game is described in association with information indicating any one of the plurality of operating units, wherein the control method of controlling the computer comprises the steps: a game region presenting step that causes a game region in which a plurality of operation reference portions respectively corresponding to the plurality of operating units are set apart from each other to be displayed on a screen of the display device; and a mark display control step that displays an operation indication mark for indicating an operation on the operating unit while moving the operation indication mark in the game region such that the operation indication mark arrives at an operation reference portion corresponding to an operating unit associated with an operation timing indicated by the sequence data at the operation timing, wherein the sequence data further includes display start information setting a display start timing of an operation indication mark corresponding to a next operation timing next to a certain operation timing to a timing earlier than the certain operation timing when a time interval between the certain operation timing and the next operation timing is less than a predetermined value, and the mark display control step further includes a step that starts to display an operation indication mark separate from the operation indication mark corresponding to the certain operation timing at the display start timing based on the sequence data as the operation indication mark corresponding to the next operation timing. It is possible to actualize a game system of the present invention by executing the control method of controlling a computer of the present invention.

A game system according to a second embodiment of the present invention comprises: a display device that displays and outputs a game screen; an input device including at least one operating unit; a sequence data storage device that stores sequence data in which an reference timing during a game is described; a game region presenting device that causes a game region in which a plurality of reference portions are set apart from each other to be displayed on the game screen of the display device; and a mark display control device that displays an operation indication mark for indicating an operation on the operating unit while moving the operation indication mark in the game region such that the operation indication mark arrives at at least one reference portion among the reference portions at a reference timing designated by the sequence data, wherein the sequence data further includes display start information setting a display start timing of an operation indication mark corresponding to a next reference timing next to a certain reference timing to a timing earlier than the certain reference timing when a time interval between the certain reference timing and the next reference timing is less than a predetermined value, and the mark display control device starts to display an operation indication mark separate from the operation indication mark corresponding to the certain reference timing at the display start timing based on the sequence data as the operation indication mark corresponding to the next reference timing.

According to the second embodiment of the present invention, in a game in which the operation indication mark arrives at at least one reference portion at the reference timing described in the sequence data, the moving velocity of the operation indication mark can be prevented from becoming too fast. In this game, it is preferable that one operating unit be operated in tune with an arrival at one reference portion, and thus this game can be played by a single player. In other words, according to this embodiment, a game that can prevent a moving velocity of an operation indication mark from becoming too fast and be used in a one-player game can be actualized.

Advantageous Effects of Invention

As described above, according to the present invention, it is possible to prevent the moving velocity of the operation indication mark from becoming too fast.

DESCRIPTION OF EMBODIMENTS

First Embodiment

Figure 1:
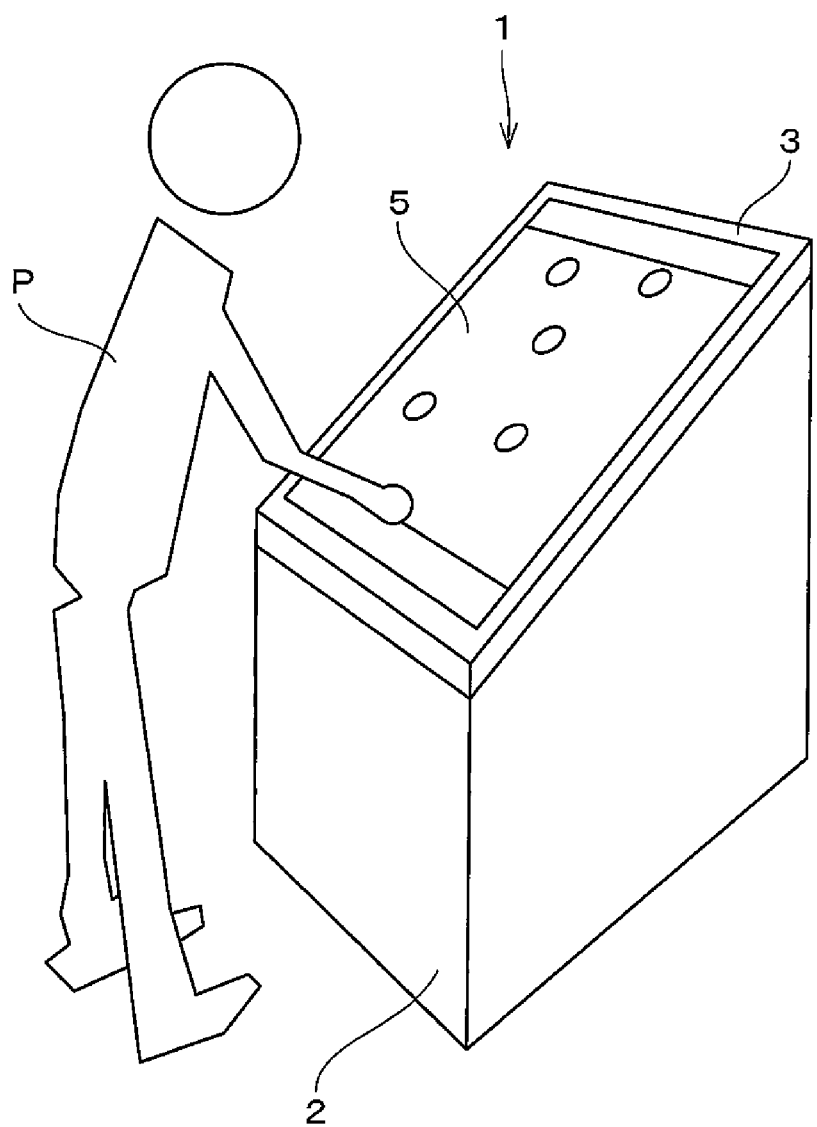
FIG. 1 is a diagram illustrating a game machine for business use to which a game system according to an embodiment of the present invention is applied.

Hereinafter, a first embodiment of a game system according to the present invention will be described. FIG. 1 is a diagram illustrating a game machine for business use to which a game system according to the first embodiment of the present invention is applied. As illustrated in FIG. 1, a game machine 1 includes a casing 2, and a monitor 3 serving as a display device arranged, obliquely toward a player P side, on the top surface of the casing 2. A transparent touch panel 5 serving as an input device is superimposed on the surface of the monitor 3. The touch panel 5 is a known input device that outputs a signal corresponding to a contact position when the player P contacts the touch panel 5 with his/her finger or the like. In addition, the game machine 1 includes various kinds of input devices and output devices provided in a typical game machine for business use such as a button used to make a selection or a decision, a power switch, a volume operation switch, and a power lamp, which are not illustrated in FIG. 1.

Figure 2:
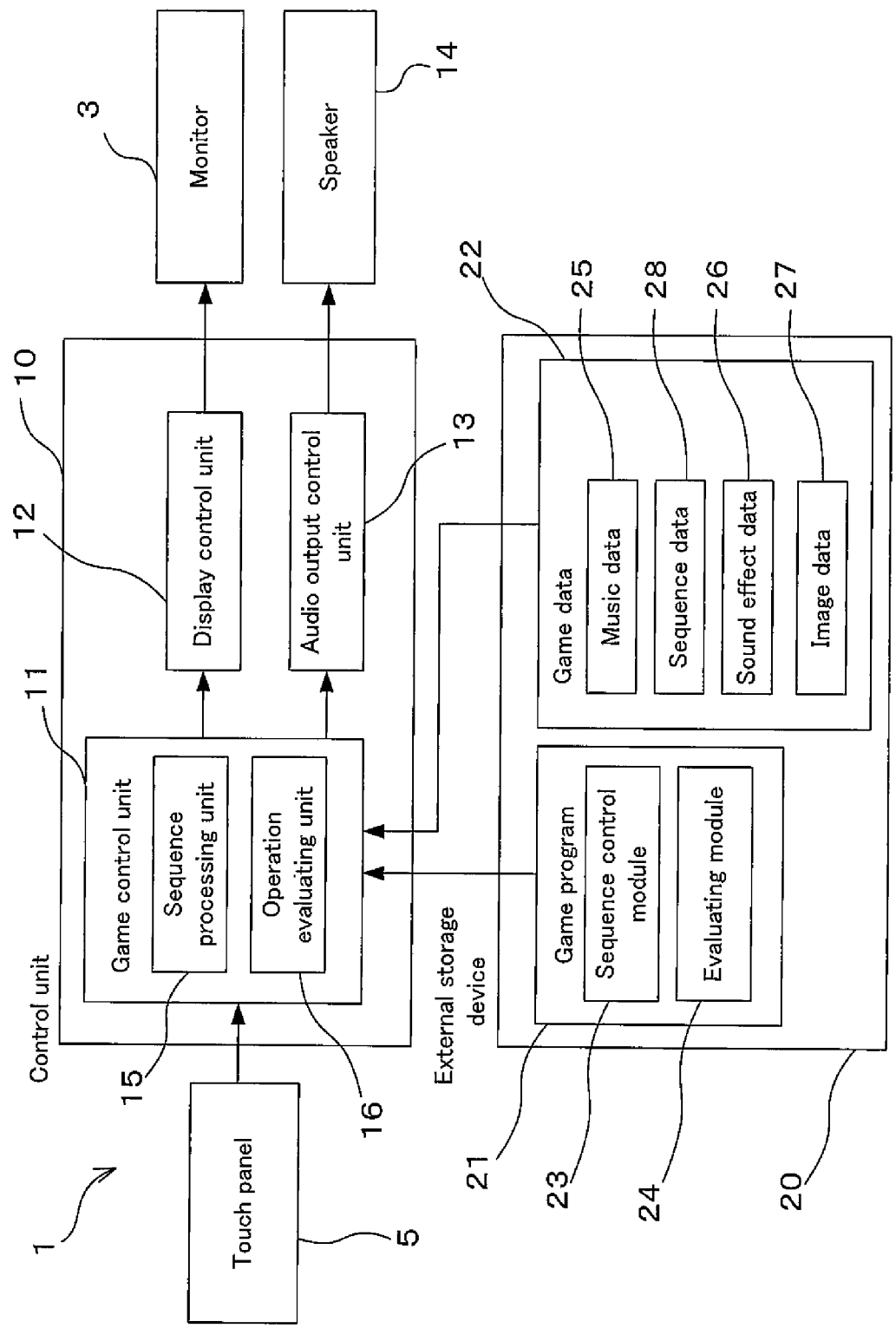
FIG. 2 is a functional block diagram of a game machine.

FIG. 2 is a functional block diagram of the game machine 1. As illustrated in FIG. 2, a control unit 10 serving as a computer is provided in the casing 2. The control unit 10 includes a game control unit 11 serving as a control host, a display control unit 12 and an audio output control unit 13 which operate according to an output from the game control unit 11. The game control unit 11 is configured as a unit in which a microprocessor is combined with various kinds of peripheral devices such as an internal storage device (for example, a read only memory (ROM) or a random access memory (RAM)) necessary for an operation of the microprocessor. The display control unit 12 causes a predetermined image to be displayed on the monitor 3 by rendering an image corresponding to image data provided from the game control unit 11 in a frame buffer and then outputting a video signal corresponding to the rendered image to the monitor 3. The audio output control unit 13 causes a predetermined sound (including music or the like) to be reproduced from a speaker 14 by generating an audio reproduction signal corresponding to audio reproduction data provided from the game control unit 11 and then outputting the generated audio reproduction signal to the speaker 14 serving as an audio output device connected to the control unit 10.

The game control unit 11 is connected with an external storage device 20. As the external storage device 20, there is used a storage medium in which data remains stored even when power is not supplied such as an optical storage medium including a digital versatile disc-read only memory (DVD-ROM) and a compact disc-read only memory (CD-ROM) or the like, or a non-volatile semiconductor memory device including an electrically erasable programmable read-only memory (EEPROM) or the like.

A game program 21 and game data 22 are stored in the external storage device 20. The game program 21 is a computer program necessary for the game machine 1 to execute a music game according to a predetermined procedure, and includes a sequence control module 23 and an evaluating module 24 in order to actualize a function according to the present invention. When the game machine 1 is activated, the game control unit 11 executes various kinds of initial settings necessary to operate as the game machine 1 by executing an operation program stored in an internal storage device thereof, and then sets an environment in which a music game is executed according to the game program 21 by reading the game program 21 and then executing the game program 21 from the external storage device 20. When the sequence control module 23 of the game program 21 is executed by the game control unit 11, a sequence processing unit 15 is generated in the game control unit 11. Further, when the evaluating module 24 of the game program 21 is executed by the game control unit 11, an operation evaluating unit 16 is generated in the game control unit 11. The sequence processing unit 15 and the operation evaluating unit 16 are logical devices actualized by a combination of computer hardware and a computer program. The sequence processing unit 15 executes music game processes such as a process of instructing the player to make an operation in tune with reproduction of music (musical composition) selected by the player and generating a sound effect in response to the player's operation. The operation evaluating unit 16 executes processes such that a process of evaluating the player's operation and then controlling a game based on an evaluation result. Incidentally, the game program 21 includes various kinds of program modules necessary to execute a music game in addition to the modules 23 and 24, and logical devices corresponding to the modules are generated in the game control unit 11 although not illustrated.

The game data 22 includes various pieces of data to be referred to when a music game is executed according to the game program 21. For example, the game data 22 includes music data 25, sound effect data 26, and the image data 27. The music data 25 is data necessary to cause a piece of music which is a target of a game to be reproduced and output from the speaker 14. FIG. 2 illustrates a single kind of music data 25, but the player can actually select a piece of music to be played from among a plurality of pieces of music. In the game data 22, one or more pieces of the music data 25 are recorded in association with information identifying each piece of music. The sound effect data 26 is data in which each of one or more types of sound effects to be output from the speaker 14 in response to the player's operation is recorded in association with a unique code for each of the sound effects. Sounds of musical instruments and various kinds of sounds are included as the sound effect. Pieces of sound effect data which are equal in number to a predetermined octave number and have different musical pitches according to a kind may be prepared. The image data 27 is data used to cause a background image, various kinds of objects or icons, and the like in a game screen to be displayed on the monitor 3.

The game data 22 further includes sequence data 28. The sequence data 28 is data used to define an operation to be indicated to the player. At least a piece of sequence data 28 is prepared for a single music data. The details of the sequence data 28 will be described later.

Figure 3:
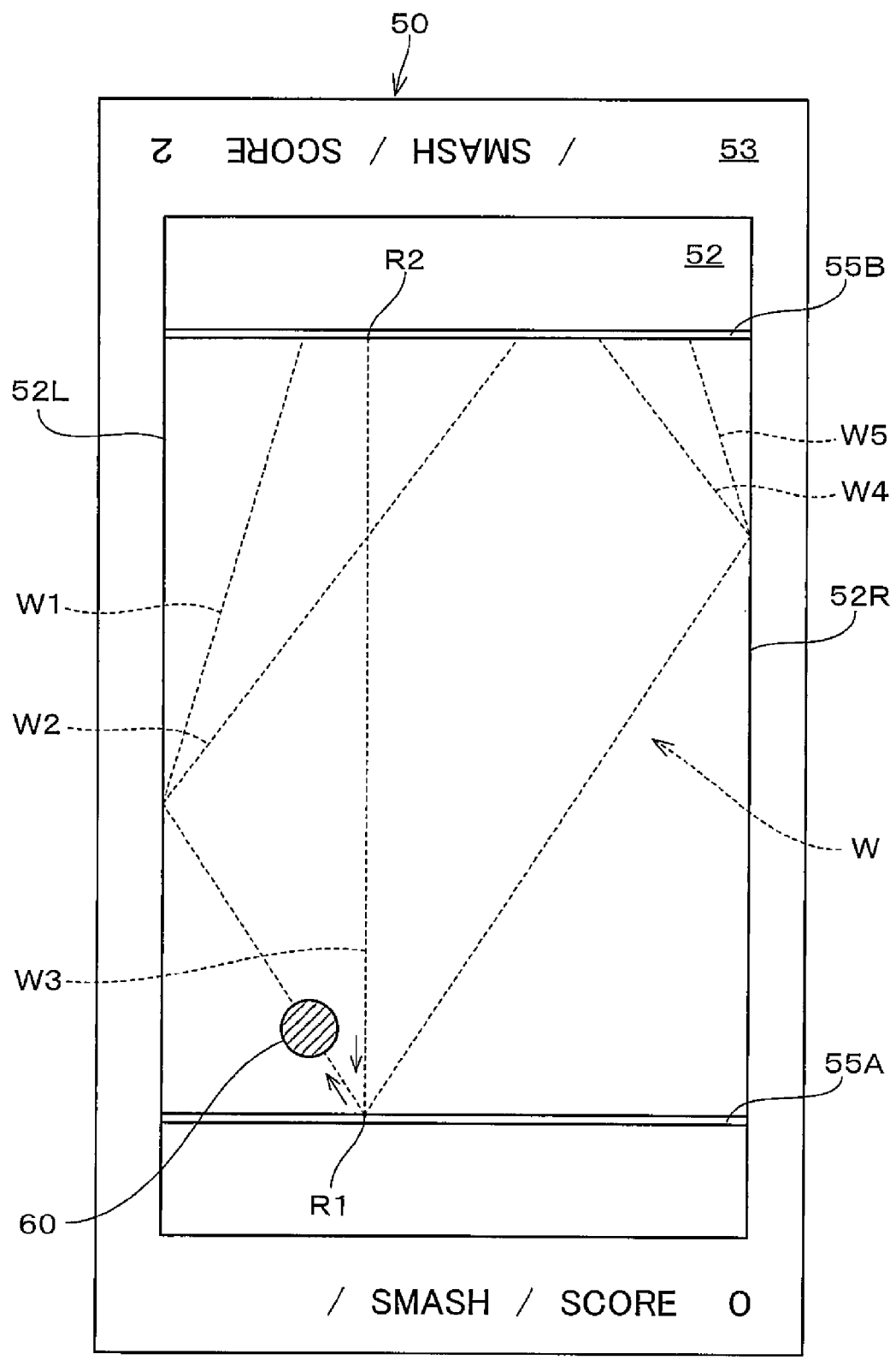
FIG. 3 is a diagram schematically illustrating a game screen.

Next, an outline of a music game executed by the game machine 1 will be described. The game machine 1 is configured as a music game machine of a match-up type which competes for a result by operation timings of two players (including a case in which the game machine 1 functions as the other player) when the two players execute an operation in tune with music. FIG. 1 illustrates only one game machine, but the game may be played through a plurality of game machines 1 connected to share a game situation. FIG. 3 is a diagram schematically illustrating a game screen. The game screen 50 includes a game region 52 for guiding operation timing to the player and an information region 53 for displaying a score and the like of each player. The game region 52 has a rectangular shape. A first operation reference portion 55A and a second operation reference portion 55B serving as an operation reference portion are arranged so as to face each other on both ends of the game region 52 in a longitudinal direction. Each of the operation reference portions 55A and 55B extends in the form of a straight line in a direction orthogonal to the longitudinal direction of the game region 52. Each of the operation reference portions 55A and 55B is used as a reference of a current time on the game by the player of the game. Specifically, the first operation reference portion 55A is used as a reference of a current time of a first player, and the second operation reference portion 55B is used as a reference of a current time of a second player. In the example of FIG. 3, a red straight line is used as the first operation reference portion 55A, and a blue straight line is used as the second operation reference portion 55B, and different colors for each player are used for identifying each player. Further, the information region 53 is arranged around the game region 52. One end side of the game region 52 in the longitudinal direction is used for displaying a score and like of one player, and the other end side thereof is used for displaying a score and the lie of the other player.

Each of the operation reference portions 55A and 55B includes a plurality of rebounding points arranged at predetermined intervals. The plurality of rebounding points R1 included in the first operation reference portion 55A are connected with rebounding points R2 included in the second operation reference portion through a plurality of paths W. In other words, provided is a plurality of paths W that reach from one rebounding point R1 included in the first operation reference portion 55A to a plurality of rebounding points R2 included in the second operation reference portion. In the example of FIG. 3, as examples of the plurality of paths W connecting the rebounding point R1 with the rebounding point R2, five paths W1, W2, W3, W4, and W5 extending from the rebounding point R1 are denoted by dashed lines. As illustrated in FIG. 3, any one rebounding point R1 of the first operation reference portion 55A has the five paths W1, W2, W3, W4, and W5 that extend to the five rebounding points R2 included in the second operation reference portion 55B. During execution of the music game, that is, during the progress of reproduction of music, an object 60 serving as the operation indication mark indicating an operation is displayed on the path W connecting the rebounding point R1 with the rebounding point R2 according to the sequence data 28. Incidentally, in FIG. 3, for convenience of description, the paths W1, W2, W3, W4, and W5 are denoted by the dashed lines, but none of the plurality of paths W is displayed on the actual game screen 50.

The object 60 appears at the rebounding point R1 or the rebounding point R2 at an appropriate timing in music, and then moves along the path W extending from the rebounding point R1 or R2 from one of the rebounding points R1 and R2 at the appearance position toward the other of the rebounding points R1 and R2 positioned at the opposite side according to the progress of the music. Then, the rebounding point R1 or R2 at which the object 60 has arrived serves as an appearance position of a next object 60, and the next object 60 moves from the appearance position toward the rebounding point R1 or R2 positioned at the opposite side. For this reason, the object 60 alternately rebounds from the rebounding points R1 and R2 and repeatedly moves between the operation reference portions 55A and 55B. Further, each player using the operation reference portion 55A or 55B at which the object 60 has arrived as the reference of the current time is required to perform a touch operation of touching the position of the operation reference portion 55A or 55B at which the object 60 has arrived in tune with an arrival of the object 60 at the operation reference portion 55A or 55B. When each player performs the touch operation, a time difference between a time when the object 60 matches each of the operation reference portions 55A and 55B and a time when each player has performed the touch operation is detected. The smaller the time difference is, the higher an operation of the player is evaluated. Further, a sound effect is reproduced from the speaker 14 in response to the touch operation. A well-known method may be used as the method of reproducing the sound effect. For example, as the well-known method of reproducing a sound effect, there exists a method of adding a sound effect from music while reproducing the music and a method of reproducing a sound effect corresponding to a misoperation while muting the music when missed. Further, for example, there also exists a method in which when music is divided in parts, each part is assigned to each operation timing, and an appropriate operation is executed, a part of the music assigned to a corresponding operation timing is played back (a method of forming the music by an appropriate operation at each operation timing. For this reason, when a misoperation is made, a part of the music to which the operation timing is assigned is not reproduced).

In the example of FIG. 3, the object 60 moves toward the rebounding point R2 of the second operation reference portion 55B along the path W2. At this time, it is preferable that the second player using the second operation reference portion 55B as the reference of the current time performs the touch operation at the position of the second operation reference portion 55B at which the object 60 arrives in tune with an arrival at the second operation reference portion 55B. Further, the object 60 is displayed in color corresponding to the operation reference portion 55A or 55B of a destination toward which the object 60 is currently moving. In other words, in the example of FIG. 3, the object 60 is displayed in blue until arriving at the rebounding point R2 of the second operation reference portion 55B, and a next object 60 appearing at the rebounding point R2 at the arrival position is displayed in red. In this embodiment, a plurality of operating units are configured by a combination of each of the operation reference portions 55A and 55B on the monitor 3 and the touch panel 5 superimposed thereon. Incidentally, in the following, each of the operation reference portions 55A and 55B may be used as a term representing the operating unit.

Figure 4:
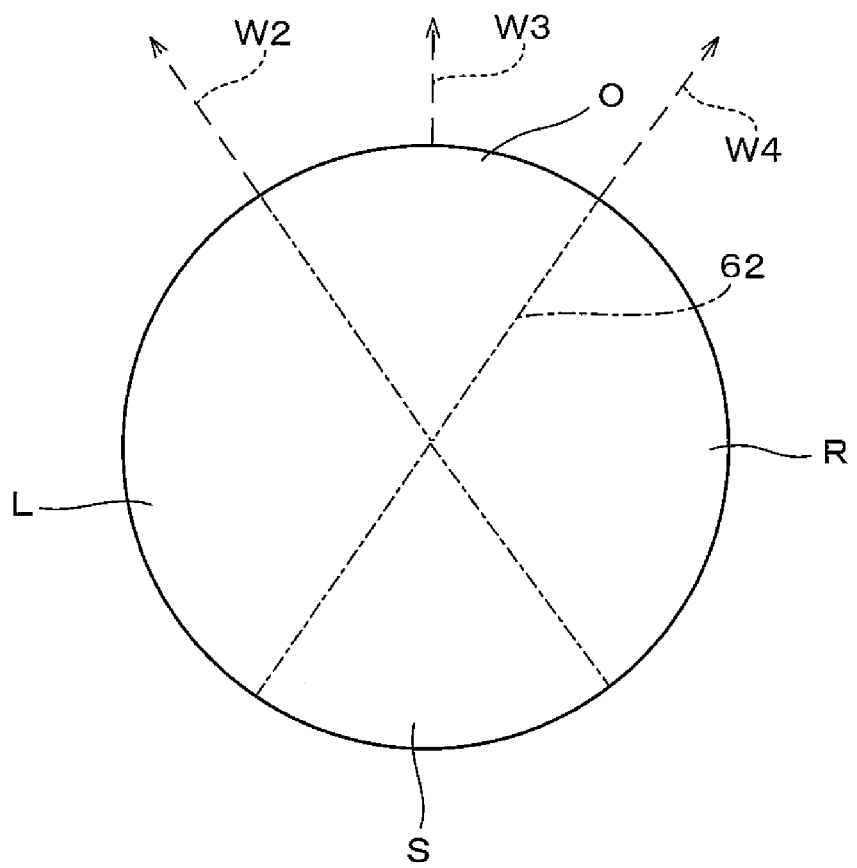
FIG. 4 is a diagram for describing a region of an object.

The path W along which the object 60 moves from one of the rebounding points R1 and R2 at the arrival position to the other of the rebounding points R1 and R2 at the opposite side is decided according to the position of the object 60 when the operation reference portion 55A or 55B is touched. In order to make a comparison of position easy, the object 60 is divided into a plurality of regions. FIG. 4 is a diagram for describing regions of the object 60. In FIG. 4, dashed lines represent the paths W2, W3, and W4, and an alternate long and short dash line 62 represents the boundary between the regions. In the example of FIG. 4, the object 60 is divided into four regions, that is, a contact region S near a contact point at which the object 60 first comes in contact with the operation reference portion 55A or 55B, right and left regions R and L that establish the boundary of the contact region S, and the remaining region O. And, as a path along which the object 60 moves, from among the paths W reaching to the rebounding point R1 from the rebounding point R2, the straight line path W3 reaching to R1 at the shortest distance is selected when the contact region S or the remaining region O is touched, the first right path W4 reaching to R1 through a right side wall 52R of the game region 52 in the longitudinal direction is selected when the left region L is touched, and the first left path W2 reaching to R1 through a left side wall 52L of the game region 52 in the longitudinal direction is selected when the right region R is touched. In other words, the moving path used when the object 60 moves to the operation reference portion 55A or 55B of the next destination is decided according to a positional relation between an operation position of the touch operation and the position of the object 60. Since the moving distance differs according to the moving path, the moving distance along which the object 60 moves to the operation reference portion 55A or 55B of the next destination differs according to the positional relation between the operation position and the position of the object 60. Meanwhile, an operation timing to touch the object 60, that is, a timing at which the object 60 arrives at each of the operation reference portions 55A and 55B is constant regardless of the moving path. For this reason, the moving velocity of the object 60 differs according to the moving path. In other words, the path W and the moving velocity of the object 60 that moves toward one player change according to the other player's touch operation. Since this changes a difficulty level of a game, and each player executes his/her operation while being conscious of influence on the other player. An example in which the second right path W5 and the second left path W1 are selected will be described later.

As described above, the object 60 moves between the operation reference portions 55A and 55B, that is, between players in order to indicate each player's operation. However, depending on music, there are cases in which an interval between one player's operation and the other player's operation is short as a matter of a performance interval. An example of this case will be described using "tan" representing a crotchet and "ta" representing a quaver. For example, let us assume that music is performed in order of "tan," "tan," "ta," "ta," and "tan." In this case, "ta" representing a quaver is shorter in the performance interval than "tan" representing a crotchet. Thus, when this performance is alternately executed on the operation reference portions (it is assumed that two operation reference portions B and A are provided), for example, when the performance is executed in order of B(tan)→A(tan)→B(ta)→A(ta)→B(tan), the moving velocity of the object 60 indicating B(ta)→A(ta) is twice as fast as the moving velocity of the object 60 indicating B(tan)→A(tan). When the short interval like this is guided only by one object 60, there may be generated a inappropriate guidance such as a case that the moving velocity of the object 60 moving between the operation reference portions 55A and 55B becomes too fast for the player to recognize. In order to prevent the inappropriate guidance like this, when an interval between one player's operation and the other player's operation is shorter than a predetermined value, the number of objects 60 to be displayed is increased to two at an immediately previous operation timing of one player at which the short interval occurs. Of the two objects 60, one object 60 moves toward the other player in order to guide a next operation timing, and the other object 60 moves toward the other player more slowly than one object 60 in order to guide an operation timing at which the other player is to make an operation after the other player's next operation, that is, an operation timing of the short interval that may occur after one player's operation when only one object 60 is used.

For example, an example in which a moving time from the second operation reference portion 55B (B in the above music example) to the first operation reference portion 55A (A in the above music example) is shorter than a predetermined value (when "ta" is indicated) will be described. In this case, two objects 60 appear at an appearance position of an object 60 of second previous movement (B(tan)→A(tan) in the above music example) at which movement (B(ta)→A(ta) in the above music example) shorter than the predetermined value occurs, that is, at the second operation reference portion 55B (B in the above music example) at which second previous movement starts. Then, one object 60 moves toward the first operation reference portion 55A in order to indicate a next operation timing (A(tan) in the above music example), and the other object 60 moves toward the first operation reference portion 55A in order to indicate an operation timing (A(ta) in the above music example) after a next operation timing (A(tan) in the above music example). In other words, one object 60 moves to indicate a next operation timing (A(tan) in the above music example), and the other object 60 moves to indicate a thirdly subsequent operation timing (A(ta) by movement of B(ta)→A(ta) in the above music example) having an interval shorter than the predetermined value when only one object 60 is used. That is, when a time interval between a certain operation timing (B(ta) in the above music example) and a next operation timing (A(ta) in the above music example) is shorter than the predetermined value, the number of objects 60 to be displayed is increased to two at a timing (B(tan) of B(tan)→A(tan) in the above music example) at which an object 60 corresponding to an operation timing (A(tan) of B(tan)→A(tan) in the above music example) before the certain operation timing having the short time interval therefrom starts to be displayed, one object moves to indicate a nearest operation timing (an operation timing before the certain operation timing, that is, A(tan) in the above music example), and the other object moves to indicate the operation timing (the operation timing subsequent to the certain operation timing, that is, A(ta) in the above music example) having the short time interval therefrom.

Figure 5:
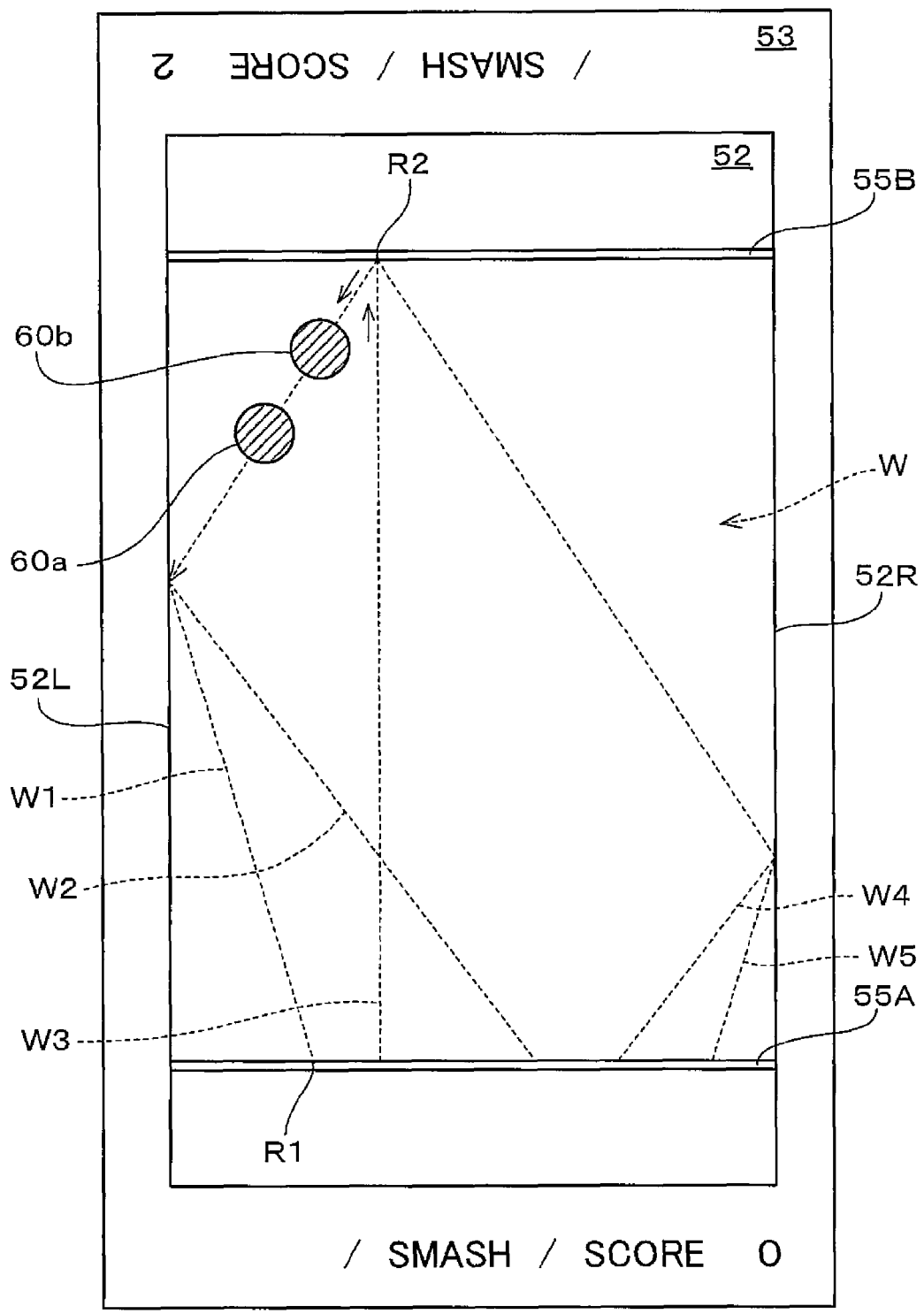
FIG. 5 is a diagram schematically illustrating a game screen of a state in which the number of objects is increased.

FIG. 5 schematically illustrates a game screen of a state in which the number of objects 60 is increased. The example of FIG. 5 illustrates a state in which the object 60 arrives at the second operation reference portion 55B, and thereafter the number of objects increases such that the object is divided into two, that is, a first object 60a and a second object 60b. Further, the path W is selected such that the first object 60a and the second object 60b move along different paths W. The example of FIG. 5 illustrates a case in which the right region R of the object 60 is touched on the second operation reference portion 55B. In this example, one first object 60a moves along the first left path W2 corresponding to the touched right region R, and the other second object 60b shares the path halfway with the first left path W2 and then moves along the second left path W1 having the different rebounding point R1. Further, in the example of FIG. 5, when the left region L of the object 60 is touched, one first object 60a moves along the first right path W4, and the other second object 60b shares the path halfway with the first right path W4 and then moves along the second right path W5 having the different rebounding point R1. In other words, in the example of FIG. 5, the second left path W1 and the second right path W5 are set as paths of the second object 60b when the number of objects 60 is increased to two. Meanwhile, when the contact region S or the remaining region O is touched, the second object 60b moves along the straight line path W3 which is the same as the path of the first object 60a. Incidentally, the present invention is not limited to the embodiment in which the second left path W1 and the second right path W5 are set as the paths for the second object 60b. For example, the paths W1 and W5 may be shared between the first object 60a and the object 60. Further, in the example of FIG. 5, one object 60a and the other object 60b move along the paths W different from each other based on a previously set rule, but various relations may be established between a moving path of one object 60a and a moving path of the other object 60b. For example, unlike the example of FIG. 5, the other object 60b may move along the first right path W4 which is opposite to the path of one object 60a or may move along the first left path W2 which is the same as the path of one object 60a.

Figure 6:
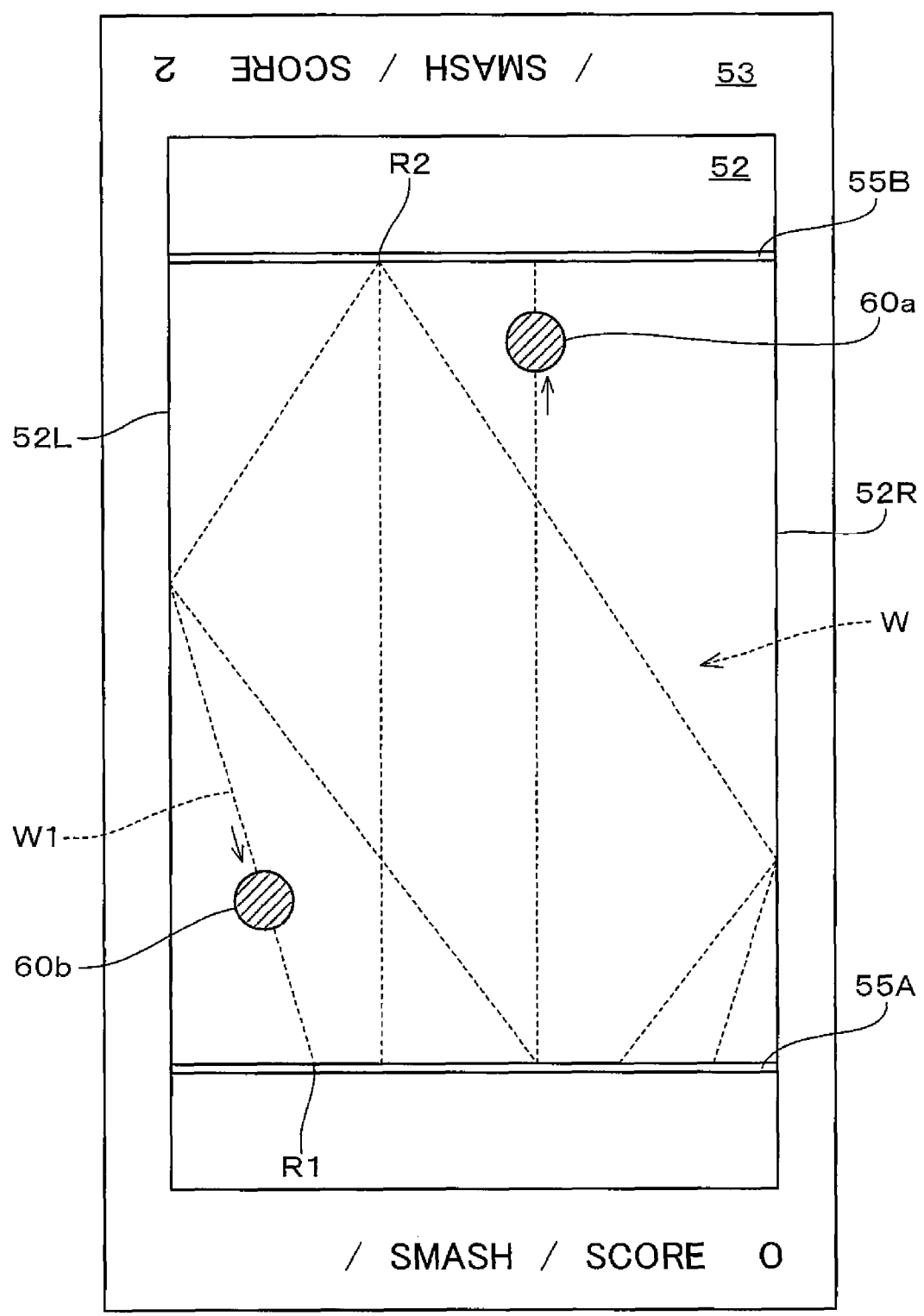
FIG. 6 is a diagram schematically illustrating a game screen of a state in which a predetermined time has elapsed from the state of the game screen illustrated in FIG. 5.

FIG. 6 schematically illustrates a game screen of a state in which a predetermined time has elapsed from the state of FIG. 5. In FIG. 6, of the objects 60a and 60b, one first object 60a arrives at the first operation reference portion 55A, then newly moves toward the second operation reference portion 55B, and so is positioned immediately before arriving at the second operation reference portion 55B, whereas the other the second object 60b is positioned immediately before arriving at the first operation reference portion 55A. In the example of FIG. 6, the distance from the first object 60a rebounded at the first operation reference portion 55A to the second operation reference portion 55B is shorter than the distance from the second object 60b to the first operation reference portion 55A. Further, the first object 60a is faster in the moving velocity than the second object 60b. For this reason, the first object 60a first arrives at the second operation reference portion 55B, and thereafter the second object 60b arrives at the first operation reference portion 55A soon. When these operation timings are indicated by only one object 60, the object 60 needs to move from the second operation reference portion 55B to the first operation reference portion 55A positioned at the opposite side in a short time immediately after arriving at the second operation reference portion 55B. However, in the example of FIG. 6, the object 60 does not move in a short time, and instead, the second object 60b is used to cause an arrival of the second object 60b to the first operation reference portion 55A to be anticipated, that is, to cause an indication of an operation timing to the first player to be anticipated. Incidentally, the rebounding point R1 or R2 at which the object 60a or 60b has arrived is not necessarily used as the appearance position of the next object 60a or 60b. For example, in order to restore the state in which an operation timing is guided by a single object 60, the first object 60a or the second object 60b may disappear upon arriving at the operation reference portion 55A or 55B. Further, depending on the performance interval, the rebounding point R1 or R2 at which the object 60a or 60b has arrived may be used as the appearance position of the next object 60a or 60b, so that the state in which the two objects 60 are displayed may be continued, or a third object 60 or a fourth object 60 may appear at the rebounding point R1 or R2 at which the object 60a or 60b has arrived.

Figure 7:
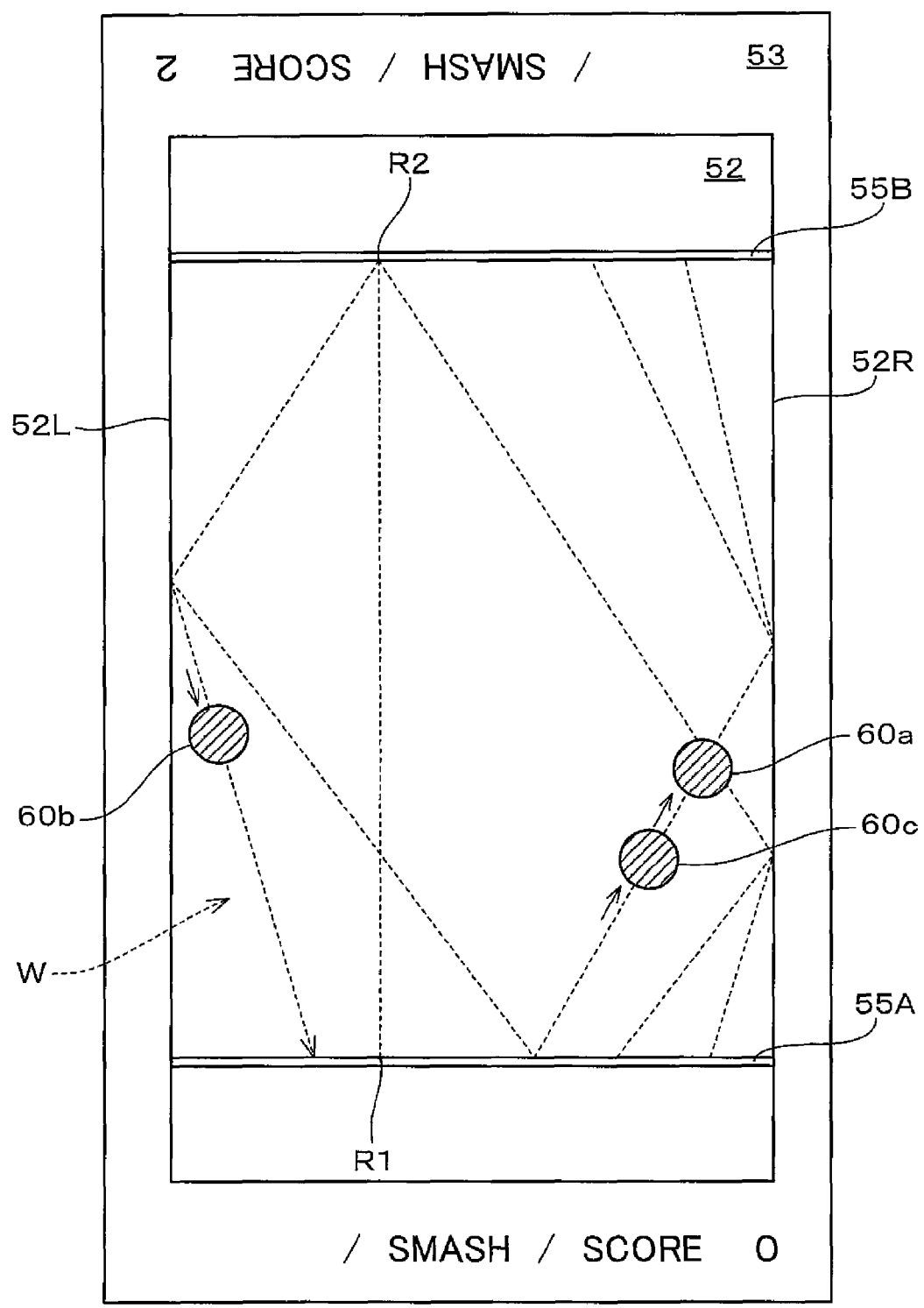
FIG. 7 is a diagram schematically illustrating a game screen of a state in which the number of objects is further increased from the state of the game screen illustrated in FIG. 5.

FIG. 7 is a diagram schematically illustrating a game screen of a state in which the number of objects 60 is further increased. In the example of FIG. 7, after the first object 60a arrives at the first operation reference portion 55A, a third object 60c is additionally displayed at the arrival position, and thus a total of three objects 60 are displayed on the game region 52. The third object 60c moves toward the second operation reference portion 55B at the velocity slower than the first object 60a, and guides an operation timing to the second player when the performance interval is short, similarly to the second object 60b in the example of FIG. 6. Incidentally, the second object 60b need not necessarily arrive at the first operation reference portion 55A between the arrival of the first object 60a at the second operation reference portion 55B and the arrival of the third object 60c at the second operation reference portion 55B so that an operation timing is alternately guided to each player. In other words, the first object 60a and the third object 60c may consecutively arrive at the second operation reference portion 55B and consecutively indicate operation timings to the second player. In the following, when the objects 60a to 60c need not be distinguished from one another, the objects 60a to 60c are described as the object 60.

Figure 8:
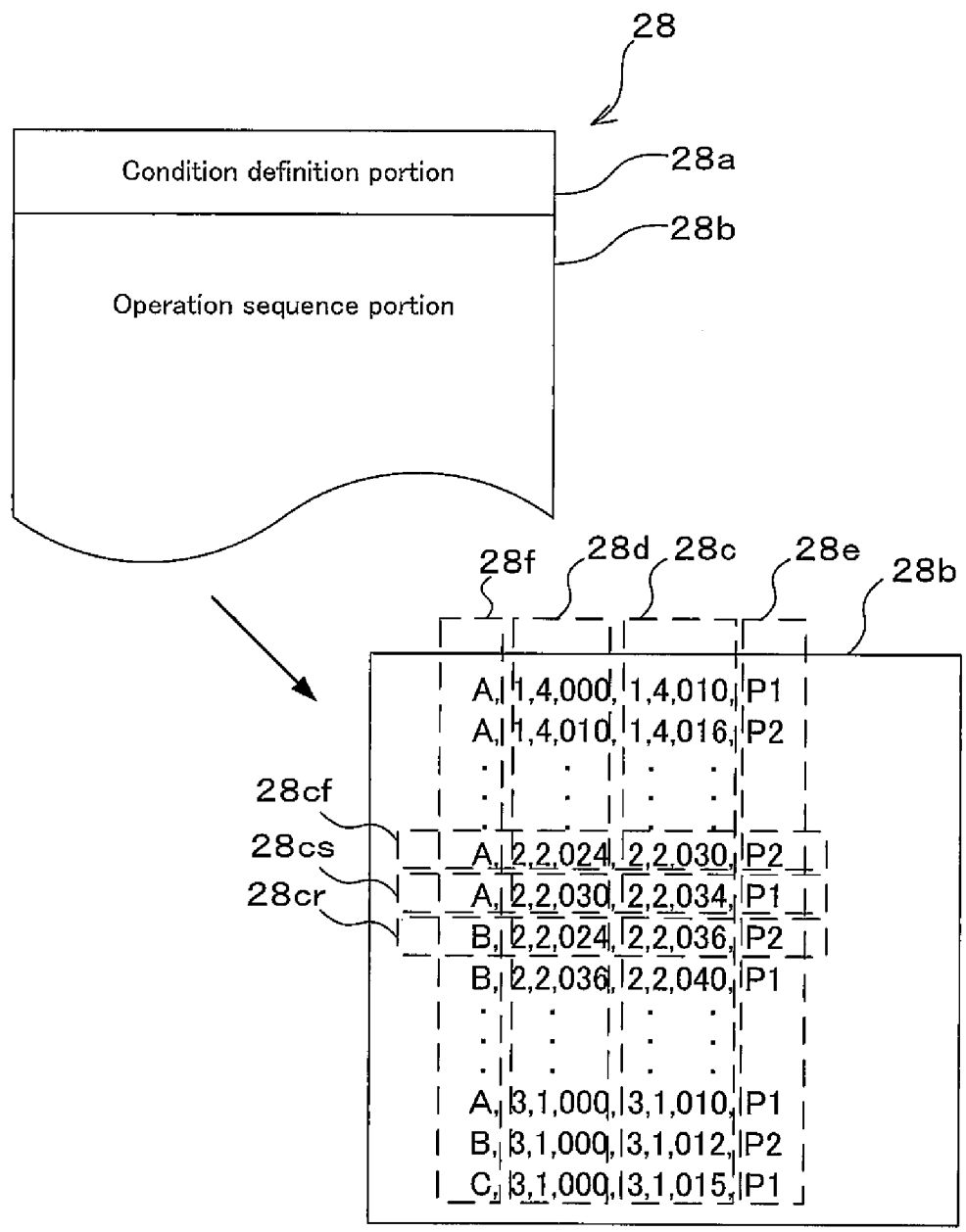
FIG. 8 is a diagram illustrating an example of content of sequence data.

Next, the details of the sequence data 28 will be described with reference to FIG. 8. The sequence data 28 includes a condition definition portion 28a and an operation sequence portion 28b as illustrated in FIG. 8. The condition definition portion 28a includes information designating an execution condition of a game that differs according to the music such as information designating the tempo, a beat, a track of music, and a sound effect to be generated when the touch operation is performed on the object 60. Incidentally, in FIG. 8, the condition definition portion 28a is included only in the head portion of the sequence data 28, but the condition definition portion 28a may be added to an appropriate intermediate position of the operation sequence portion 28b. Thus, processing of changing the tempo of the music, an assignment of a sound effect, or the like can be actualized.

Meanwhile, in the operation sequence portion 28b, a timing to touch the object 60, a display start timing, and information indicating a player (or each of the operation reference portions 55A and 55B) are described in association with one another for each object 60. FIG. 8 is a diagram illustrating an example of content of the sequence data. As partially illustrated in FIG. 8, the operation sequence portion 28b includes an operation timing portion 28c that indicates a timing (operation timing) to make an operation in the music, a display start information portion 28d used to set a display start timing to start a display of the object 60, a display position indication portion 28e that indicates a player (or each of the operation reference portions 55A and 55B) in which the object 60 starts to be displayed, and a mark information portion 28f indicating the object 60 to be displayed. And, the operation sequence portion 28b is configured as a set of a plurality of records in which an operation timing to perform an operation in the music, a display start timing of the object 60, and a player (or each of the operation reference portions 55A and 55B) in which the object 60 starts to be displayed are described in association with one another for each object 60 to be displayed. The operation timing and the display start timing are described such that a bar number in the music, a beat number, and a value representing a time in a beat are separated by a comma. The time in a beat refers to an elapsed time from the head of one beat, and is represented by the number of units, from the head of the beat, obtained by equally dividing the length of one beat into n unit times. For example, when a time in which n is 100, and ¼ elapses from the head of the second beat in the second beat of the first bar of music is designated as an operation timing or a display start timing, "01,2,025" is described.

The operation timing portion 28c includes an operation timing in which a time interval between a certain operation timing and a next operation timing subsequent to the certain operation timing is less than a predetermined value. In the example of FIG. 8, a certain operation timing 28cs corresponding to the certain operation timing, a previous operation timing 28cf prior to the certain operation timing 28cs, and a next operation timing 28cr corresponding to the next operation timing as an operation timing subsequent to the certain operation timing 28cs are surrounded by dashed lines. In the example of FIG. 8, a timing matching a display start timing set to the previous operation timing 28cf is set to a display start timing of the next operation timing 28cr. In the example of FIG. 5, an operation timing corresponding to the first object 60a corresponds to the previous operation timing 28cf, and an operation timing corresponding to the second object 60b corresponds to the next operation timing 28cr. Further, in the example of FIG. 6, an operation timing corresponding to the first object 60a corresponds to the certain operation timing 28cs. The next operation timing 28cr, the previous operation timing 28cf, and the certain operation timing 28cs are associated with information indicating different objects 60 from one another.

A player in which the object 60 starts to be displayed is described as "P1" when a first player is indicated, or is described as "P2" when a second player is indicated. Incidentally, the indication of the player corresponds to a indication of the color of the object 60 to be displayed. For example, a blue object 60 is displayed when the indication of the player is "P1", and a red object 60 is displayed when the indication of the player is "P2."

In the mark information portion 28f, for example, information indicating the object 60 to be displayed is described by a letter such as "A". "A" is used as a letter corresponding to a first object 60 to be displayed on the game region 52, "B" is used as a letter corresponding to a second object 60, and "C" is used as a letter corresponding to a third object 60. In other words, various kinds of letters according to the number of objects 60 to be displayed on the game region 52 are used as the information indicating the object 60 to be displayed. In the examples of FIGS. 5 to 7, "A" is described when the object 60 or a first object 60a is indicated, "B" is described when a second object 60b displayed on the screen is indicated, and "C" is described when a third object 60c is indicated. Further, the information indicating the object 60 represents a correspondence relation between operation timings. Specifically, between operation timings associated with information indicating a common object 60, the position at which the object 60 corresponding to a certain operation timing arrives functions as an appearance position of the object 60 corresponding to another operation timing to which a display start timing closest (or equal) to the certain operation timing is set. Incidentally, when a plurality of records designating the same operation timing are present, the appearance position of the object 60 (the object 60 which will appear next) corresponding to another operation timing may be specified by specifying any one of records designating the same operation timing such as a record which is earlier in a display start timing or a record which is earlier in describing order in which the sequence data 28 is described, based on a predetermined specifying condition or the like. Further, information associating the arrival position of each object 60 with the appearance position such as information of an object 60 serving as a division source may be separately described in the sequence data.

In the example of FIG. 8, a display start timing, an operation timing, and an operation reference portion at which an object 60 starts to be displayed are indicated such that a blue object 60 is displayed on the first operation reference portion 55A which is used by the first player as the reference at a start point in time (000) of a fourth beat of a first bar, and the blue object 60 moves along the path W from the first operation reference portion 55A so as to arrives at the second operation reference portion 55B at a timing in which "010" elapses from the start point in time of the fourth beat of the first bar. Further, a red object 60 is displayed at a timing in which "010" elapses from the start point in time of the fourth beat of the first bar using the rebounding point R2 at which the object 60 arrives as the appearance position, and then the object 60 moves from the second operation reference portion 55B along the path W corresponding to the player's touch operation position so as to arrive at the first operation reference portion 55A at a timing in which "016" elapses from the start point in time of the fourth beat of the first bar. Furthermore, a red first object 60a corresponding to the previous operation timing 28cf and a red second object 60b corresponding to the next operation timing 28cr appear at the rebounding point R2 of the second operation reference portion 55B, used as a reference by the second player, at which the object 60 arrives shortly before at a timing in which "024" elapses from a start point in time of a second beat of a second bar, the first object 60a moves along the path W so as to arrive at the first operation reference portion 55A at a timing in which "030" elapses from the start point in time of the second beat of the second bar, and the second object 60b moves along the path W so as to arrive at the first operation reference portion 55A at a timing in which "036" elapses from the start point in time of the second beat of the second bar. Incidentally, in the example of FIG. 8, a record in which an indication is made on the first object 60a such that the first object 60a arrives at the first operation reference portion 55A at a timing in which "030" elapses from the start point in time of the second beat of the second bar, moves from the arrival position, and then arrives at the second operation reference portion 55B at a timing in which "034" elapses from the start point in time of the second beat of the second bar corresponds to a record of the certain operation timing 28cs.

Next, processing of the game control unit 11 when a music game is executed by the game machine 1 will be described. The game control unit 11 reads the game program 21, performs an initial setting necessary to execute a music game, and then enters a standby state to receive a game start instruction from a player. For example, the game start instruction includes an operation specifying data used in the game such as selection of music to be played in the game or a difficulty level. A procedure receiving the instruction may be the same as in a known game.

When a game start is instructed, the game control unit 11 reads the music data 25 corresponding to the music selected by the player and outputs the read music data 25 to the audio output control unit 13, and thereby the music starts to be reproduced through the speaker 14. Through this operation, the control unit 10 functions as a music reproducing device. Further, the game control unit 11 causes the game region 52 and the information region 53 to be displayed on the monitor 3 by reading the sequence data 28 corresponding to the player's selection in synchronization with reproduction of the of music, generating image data necessary to draw the game region 52 and the information region 53 with reference to the image data 27, and outputting the generated image data to the display control unit 12. Furthermore, as processes necessary to display the game region 52 or the like during execution of the music game, the game control unit 11 repeatedly executes a sequence process routine illustrated in FIG. 9, a path decision process routine illustrated in FIG. 10, and an operation evaluation routine illustrated in FIG. 11 at a predetermined period. Incidentally, the sequence processing unit 15 undertakes the routines of FIGS. 9 and 10, and the operation evaluating unit 16 undertakes the operation evaluation routine of FIG. 11.

Figure 9:
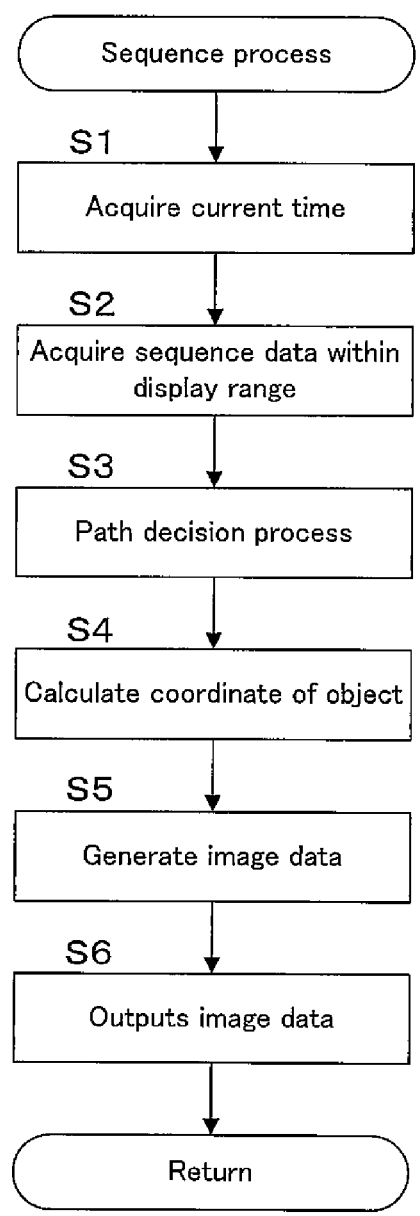
FIG. 9 is a diagram illustrating an example of a flowchart of a sequence process routine.

FIG. 9 illustrates an example of a flowchart of the sequence process routine executed by the sequence processing unit 15. When the routine of FIG. 9 starts, in step S1, the sequence processing unit 15 of the game control unit 11 first acquires a current time in the music. For example, clocking is started, by an internal clock of the game control unit 11, from a reproduction start point in time of the music, and the current time is acquired based on a value of the internal clock. Next, in step S2, the sequence processing unit 15 acquires data of a display start timing which is present within a time length corresponding to a display range of the game region 52 and data of an operation timing from the sequence data 28. For example, the display range is set to a time range of about two bars of the music from the current time to the future.

Figure 10:
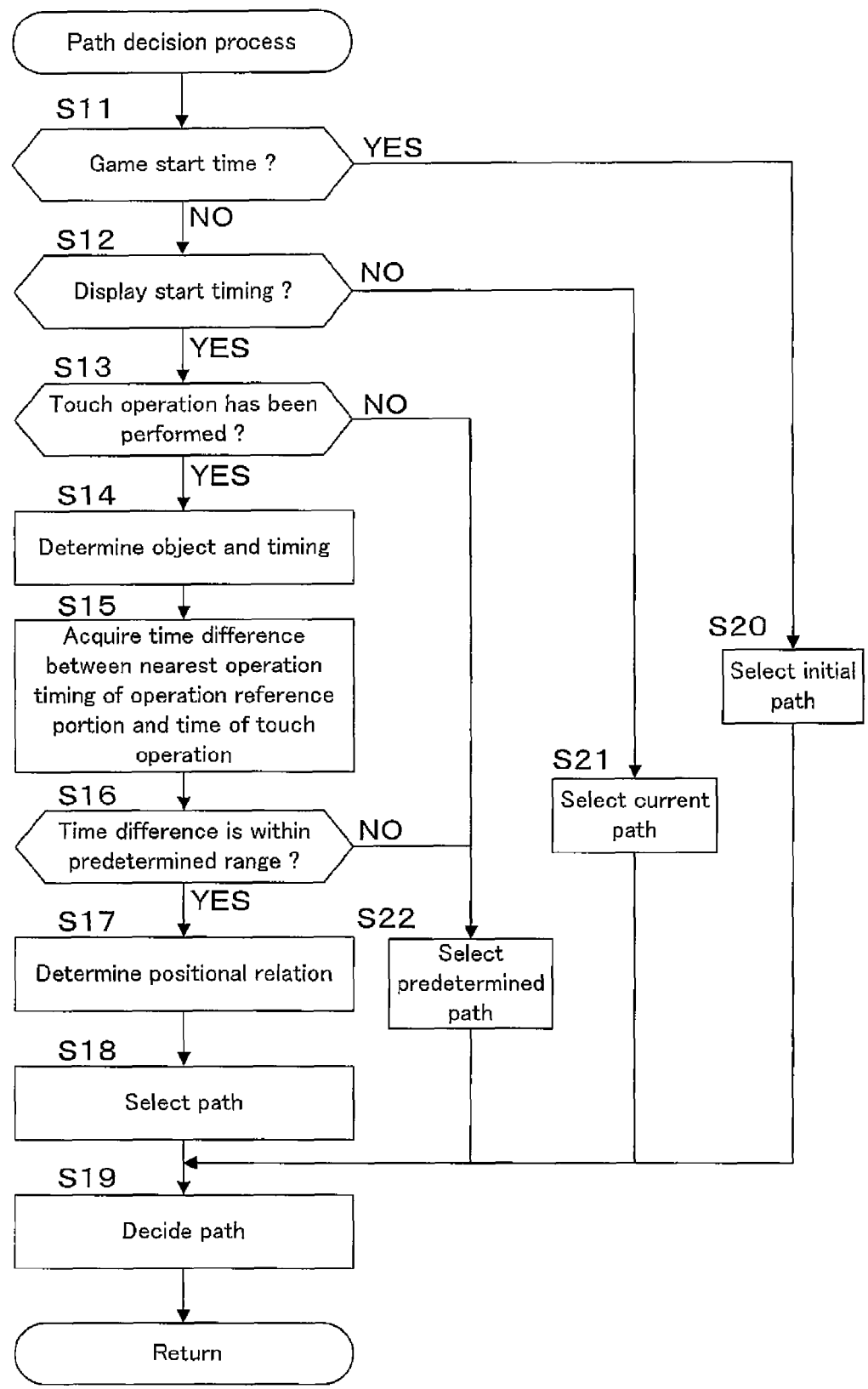
FIG. 10 is a diagram illustrating an example of a flowchart of a path decision process routine.

Next, in step S3, paths W of all objects 60 to be displayed in association with each acquired operation timing are decided. For example, this decision is actualized by executing the routine of FIG. 10. FIG. 10 illustrates an example of a flowchart of the path decision process routine executed by the sequence processing unit 15. When the routine of FIG. 10 starts, in step S11, the sequence processing unit 15 first determines whether or not this is a game start time. When a positive determination is made in step S11, the process proceeds to step S20, but when a negative determination is made, the process proceeds to step S12. In step S20, a previously set initial path is selected as a path to display the object 60, and then the process proceeds to step S19. For example, the path W3 extending from the rebounding point R1 that is included in the first operation reference portion 55A and is at an n-th position from the left side is previously set as the initial path.

Meanwhile, in step S12, it is determined whether or not a display of the object 60 is a display at a display start timing. When a negative determination is made in step S12, that is, when it is determined that a display of the object 60 is not a display at a display start timing and a path to be displayed has been already selected, the process proceeds to step S21. In step S21, a previously selected path as a path to be displayed, that is, a current path is selected, and the process proceeds to step S19.

In contrast, when a positive determination is made in step S12, that is, when it is determined that a display of the object 60 is a display at a display start timing and a path to be displayed has not been selected, the process proceeds to step S13. In step S13, it is determined whether or not the touch operation has been performed on the operation reference portion 55A or 55B with reference to an output signal of the touch panel 5. When a negative determination is made in step S13, the process proceeds to step S22, but when a positive determination is made, the process proceeds to step S14. In step S22, a predetermined path is selected as the path to display the object 60, and the process proceeds to step S19. For example, the selection of the predetermined path in step S22 is actualized such that a path adjacent to a path on which the object 60 corresponding to the object 60 that starts to be displayed, that is, the object 60 that has immediately previously arrived at the rebounding point R1 or R2 used as the appearance position of the object 60 that starts to be displayed has been displayed or a path which is at the shortest distance from the appearance position toward the operation reference portion 55A or 55B to arrive is set as the predetermined path.

Meanwhile, in step S14, an operation reference portion on which the touch operation has been performed and a timing (a time in the music) at which the touch operation has been performed are determined based on a signal output from the touch panel 5. Next, in step S15, a nearest operation timing described in the sequence data 28 with respect to the operation reference portion on which the touch operation has been performed, that is, an operation timing which is closest in time and associated in the sequence data 28 with respect to the object 60 on which the touch operation has been performed is specified, and a time difference between the operation timing and a time at which the touch operation has been performed is acquired.

Next, in step S16, the sequence processing unit 15 determines whether or not each player's operation is appropriate by determining whether or not the time difference is within a predetermined range. A predetermined time range around an operation timing of a comparison target is set as the predetermined range. When a negative determination is made in step S16, the process proceeds to step S22. In step S22, a predetermined path is selected as the path to display the object 60 as described above, and then the process proceeds to step S19. In contrast, when a positive determination is made in step S16, the process proceeds to step S17.

Next, in step S17, the positional relation between the operation position at which the touch operation has been performed on the operation reference portion 55A or 55B and the position of the object 60 is determined based on a signal output from the touch panel 5. Specifically, any one of the contact region S, the right region R, the left region L, and the remaining region of the object 60 that has most recently arrived at the appearance position is determined as the touch position of the object 60. Next, in step S18, the sequence processing unit 15 selects a path to arrange the object 60 according to the positional relation determined in step S17. For example, the selection of the path is performed as follows. First, any one of the right region R, the left region L, the contact region S, and the remaining region O is assigned to each path W (incidentally, when there is a path used when the number of the objects 60 increases such as the second left path W1 or the second right path W5 of the example of FIG. 5, this path may be excluded). Next, a path assigned to the touch position is selected from among a plurality of paths W extending from the appearance position based on the determination result in step S17. In the example of FIG. 3, in the rebounding point R1, the straight line path W3 is assigned to the contact region S and the remaining region O, the first right path W4 is assigned to the left region L, and the first left path W2 is assigned to the right region R. Thus, the straight line path W3 is selected when the contact region S or the remaining region O of the object 60 is touched, the first left path W2 is selected when the right region R is touched, and the first right path W4 is selected when the left region L is touched. Incidentally, in the example of FIG. 3, the second left path W1 is set as a path of the second object 60b in advance when the right region R of the object 60 is touched in a state in which the two objects 60a and 60b are displayed, and the second right path W5 is set as a path of the second object 60b in advance when the left region L of the object 60 is touched in a state in which the two objects 60a and 60b are displayed. Meanwhile, the straight line path W3 same as the first object 60a is set so as to be selected as a path of the second object 60b when the contact region S or the remaining region O is touched.

Next, in step S19, a path selected in each of steps S18, S20, S21, and S22 is decided as a path to display the object 60, and then the current routine ends.

Referring back to the routine of FIG. 9, in step S4, the sequence processing unit 15 calculates coordinates of all objects 60 to be displayed on each path W in the game region 52. For example, this calculation is performed as follows. First, the path W to display each object 60 included in the display range is determined based on the processing result of step S3. Next, the position of each object 60 from the operation reference portion 55A or 55B in the time axis direction (that is, the moving direction of the object 60) is determined according to the moving direction (the operation reference portion 55A or 55B at the arrival position) corresponding to each the object 60 and a time difference between each operation timing and a current time. Through this operation, it is possible to acquire the path W to arrange each object 60 and coordinates of each object 60 necessary to arrange each object 60 on the corresponding path W along the time axis from the operation reference portion 55A or 55B.

Next, in step S5, the sequence processing unit 15 generates image data necessary to draw the game region 52 based on the coordinates of the object 60 calculated in step S4. Specifically, the image data is generated so that each object 60 is arranged on the calculated coordinates. An image of the object 60 or the like may be acquired from the image data 27. Next, in step S6, the sequence processing unit 15 outputs the image data to the display control unit 12. As a result, the game region 52 is displayed on the monitor 3. When the process of step S6 ends, the sequence processing unit 15 ends the current sequence process routine. By executing repeatedly the above-described processes, the object 60 is displayed on the designated operation reference portion 55A or 55B at a display start timing described in the sequence data 28, and the object 60 moves between the two operation reference portions 55A and 55B so as to arrive at the designated operation reference portion 55A or 55B at an operation timing described in the sequence data 28.

Figure 11:
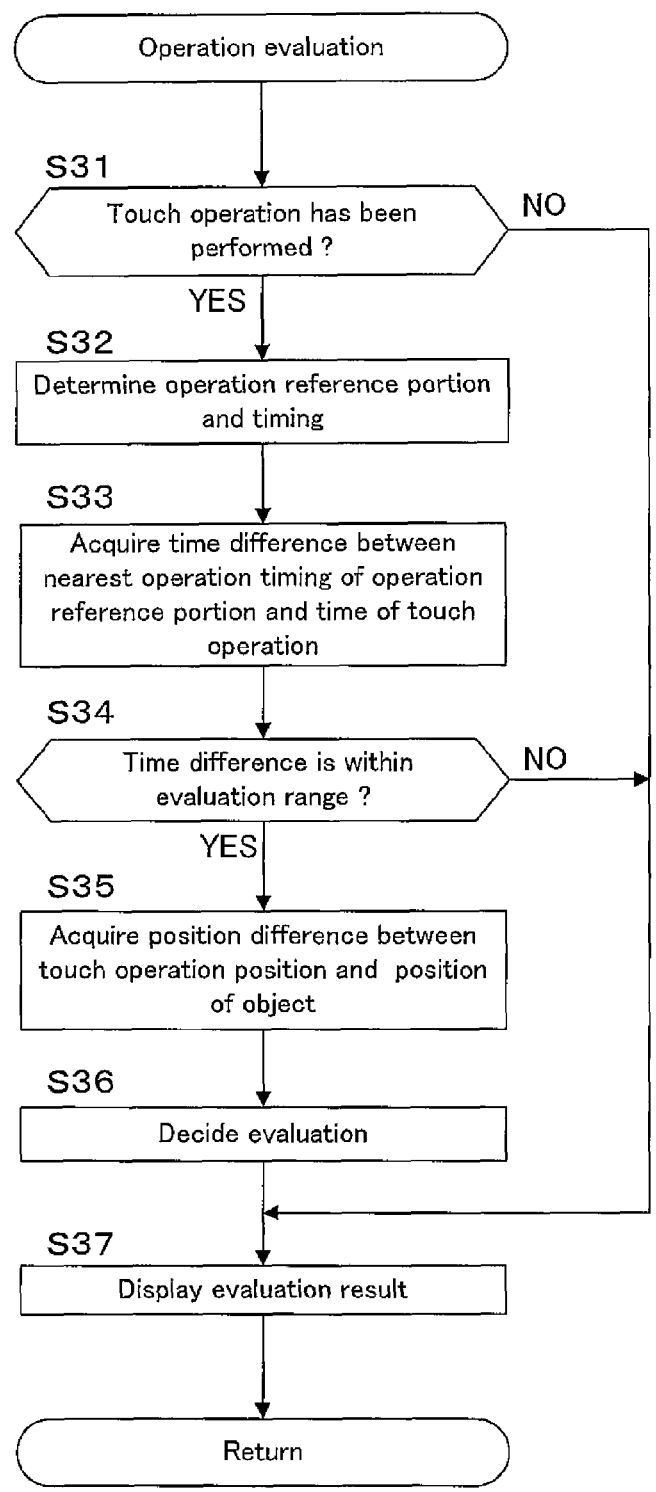
FIG. 11 is a diagram illustrating an example of a flowchart of an operation evaluation routine.

Next, the operation evaluation routine of FIG. 11 will be described. When the operation evaluation routine of FIG. 11 starts, in step S31, the operation evaluating unit 16 first determines the presence or absence of the touch operation on the object 60 with reference to an output signal of the touch panel 5. At this time, when the position other than the operation reference portions 55A and 55B is touched, it is determined no touch operation has been performed. When it is determined no touch operation has been performed, the operation evaluating unit 16 ends the current routine, and when it is determined the touch operation has been made, the process proceeds to step S32. In step S32, the operation evaluating unit 16 determines a timing (a time in the music) at which the touch operation has been made based on a position signal output from the touch panel 5. Next, in step S33, the operation evaluating unit 16 specifies a nearest operation timing described in the sequence data 28 with respect to the operation reference portion on which the touch operation has been performed, that is, an operation timing which is closest in time in the sequence data 28 with respect to the operation reference portion on which the touch operation has been performed, and acquires a time difference between the operation timing and a time at which the touch operation has been performed.

Next, in step S34, the operation evaluating unit 16 determines whether or not the player's operation is appropriate by determining whether or not the time difference is within the evaluation range. A predetermined time range around an operation timing of a comparison target is set as the evaluation range. For example, a plurality of steps of levels is set centering on an operation timing, and a time range in which the levels are set is dealt as the evaluation range. When it is determined in step S34 that the time difference is outside the evaluation range, the operation evaluating unit 16 ends the current routine. Meanwhile, when it is determined that the time difference is within the evaluation range, the process proceeds to step S35. In step S36, the operation evaluating unit 16 specifies an operation position at which the touch operation has been performed on the operation reference portion 55A or 55B and an operation timing which is closest in time in the sequence data 28 with respect to the operation reference portion at which the touch operation has been performed, and acquires a position difference between the operation position and the arrival position of the object 60 indicating the operation timing.

Next, in step S36, the operation evaluating unit 16 decides an evaluation on the player's touch operation based on the time difference acquired in step S34 and the position difference acquired in step S35. For example, this evaluation is actualized as follows. First, the evaluation related to the time difference is actualized by determining whether or not a timing of the touch operation belongs to any one of the plurality of levels set in the time range. The plurality of levels are set such that the time range is divided in units of predetermined time periods, and the touch operation that belongs to a division close to an operation timing of each division is evaluated high. Further, the evaluation related to the position difference is actualized by comparing the center position of the object 60 and the touch operation position. For example, in the evaluation of the position difference, a region up to twice the diameter of the object 60 is evaluated as "GOOD", and the remaining region is evaluated as "MISS." Alternatively, the inner side further than the outer circumference of the object 60 may be evaluated highest, a predetermined evaluation range may be set such that an evaluation is steadily lowered in units of certain distances from the outer circumference, and the evaluation may be determined according to the evaluation range to which the position of the touch operation belongs to. In this case, a difficulty level of the game is improved. Thereafter, the operation evaluating unit 16 proceeds to step S37, and controls an output to the display control unit 12 such that the evaluation result is displayed on at least one of the game region 52 and the information region 53. When the process of step S37 is completed, the operation evaluating unit 16 ends the current routine. Incidentally, in the example of FIG. 11, step of acquiring the difference between the position of the object and the position of the touch operation may be executed before step of acquiring the difference between the operation timing nearest to the operation reference portion and the time at which the touch operation has been performed. Further, in the example of FIG. 11, the evaluation of the position difference is configured so as to be evaluated as "GOOD" or "MISS" according to a region. However, when the position difference is outside the predetermined range, similarly to step S34, the subsequent process may be skipped, and then the current routine may end. In this case, for example, when an operation on the first operation reference portion 55A is required, an operation on an inappropriate position outside the predetermined range such as an operation executed on the second operation reference portion 55B can be excluded from an evaluation target.

As described above, according to this embodiment, the moving path and the moving velocity of the object 60 moving toward the next operation reference portion can be selected through the touch operation. Thus, one player can variously change a difficulty level of the game of the other player through his/her operation, and thus amusement of the game can be improved.

Furthermore, according to this embodiment, the sequence data 28 includes the display start information portion 28d in which the display start timing matching the display start timing of the previous operation timing 28cf is set to the next operation timing 28cr in which the time interval with the certain operation timing 28cs is less than the predetermined value. Thus, the second object 60b corresponding to the next operation timing 28cr can start to be displayed at the same time as the first object 60a corresponding to the previous operation timing 28cf. As a result, when a time interval between operation timings is short, the two objects 60a and 60b can be displayed from the display start timing of the first object 60a corresponding to the previous operation timing 28cf. Thus, a moving time of the object 60 corresponding to the next operation timing 28cr can be increased to be longer than when only one object 60 is used. Thus, even when a time interval between operation timings is short, the moving velocity of the operation indication mark can be prevented from being too fast. Further, since the display start timing of the second object 60b matches the display start timing of the first object 60a corresponding to the previous operation timing 28cf, natural appearance of the second object 60b can be rendered.

In the above-described embodiment, the external storage device 20 of the game machine 1 functions as a music data storage device and a sequence data storage device. Further, the control unit 10 functions as a game region presenting device and a mark display control device by causing the sequence processing unit 15 to execute the routines of FIGS. 9 and 10. Furthermore, the control unit 10 functions as an evaluating device by causing the operation evaluating unit 16 to execute the routine of FIG. 11.

Second Embodiment

In the first embodiment, a game played by a plurality of players is executed such that a plurality of players or a game machine itself functions as the other player, but the present invention is not limited to this embodiment. In a second embodiment of the present invention, the same configuration as in the first embodiment will not be described, and a main difference with the first embodiment will be described. A game executed by, for example, the game machine 1 as a game system according to the second embodiment of the present invention may be actualized such that a single first operation reference portion 55A is set to correspond to the operating unit, and the second operation reference portion 55B is arranged to simply function as a wall that causes the operation indication mark to rebound. And, the game may be executed such that only the first operation reference portion 55A is provided on the game screen, and the operation indication mark moves while rebounding from the wall serving as the reference portion provided in the boundary of the game region and then arrives at only the first operation reference portion 55A or the first operation reference portion 55A and the wall (or the other walls and the like) arranged at the position facing the first operation reference portion 55A at a timing described in the sequence data. In this case, it is possible to actualize a one-player game in which a difficulty level of a game can be variously changed. Further, in this case, the first operation reference portion 55A, the wall arranged at the position facing the first operation reference portion 55A, and the like function as a plurality of the reference portions according to the present invention. Further, a reference timing instead of an operation timing is used as the timing described in the sequence data, and among the reference timings, a timing of an arrival at the first operation reference portion 55A functions as an operation timing.

Figure 12:
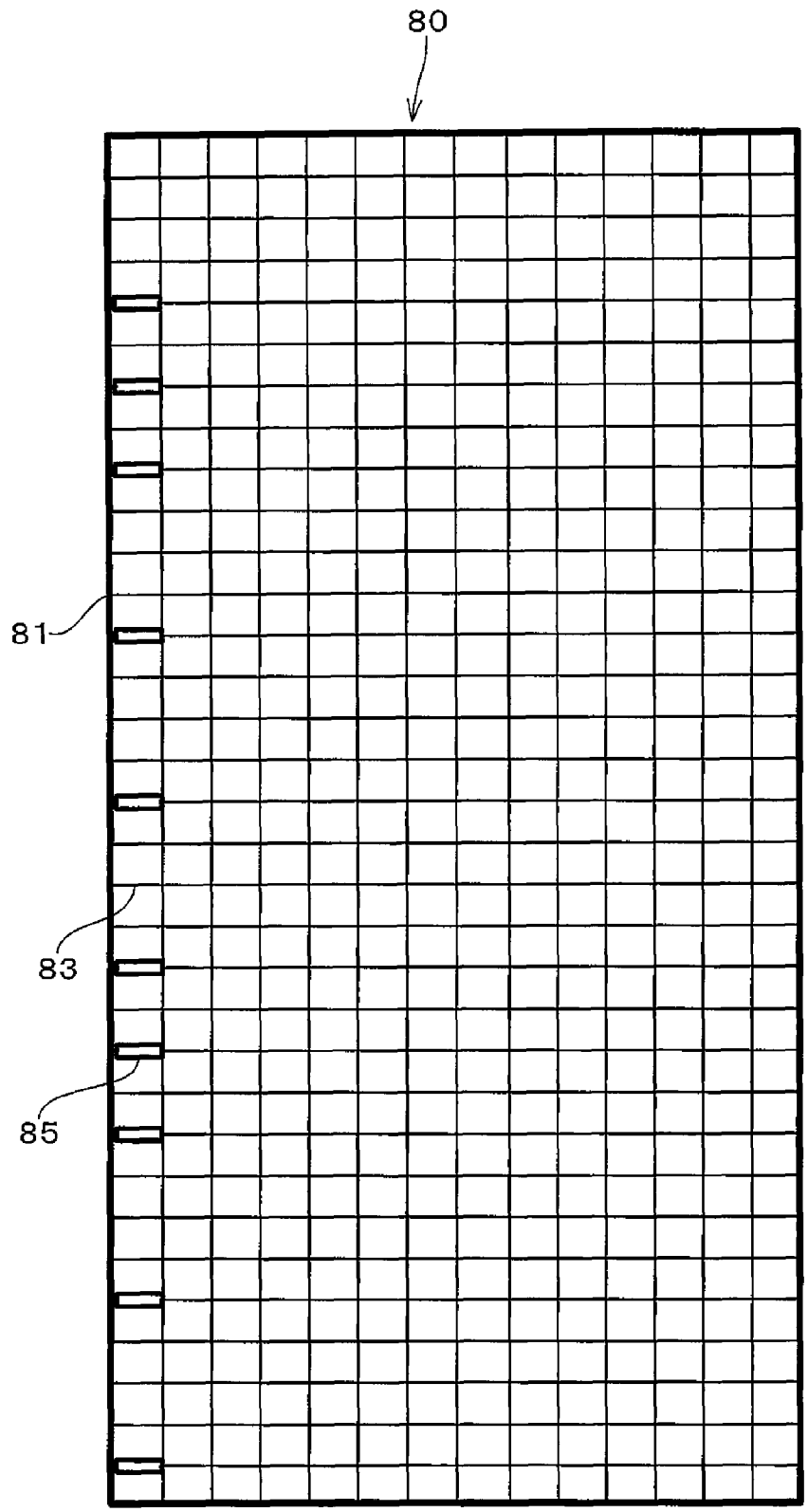
FIG. 12 is a diagram illustrating an example of basic sequence data in which only an operation timing is indicated.

The present invention is not limited to the above-described embodiment and can be implemented in appropriate embodiments. In the above-described embodiment, the sequence data 28 in which the display start timing, the operation timing, and information indicating each of the operation reference portions 55A and 55B are associated with one another for each object 60 is prepared as the sequence data in advance. However, the present invention is not limited to the embodiment in which the sequence data 28 is prepared in advance. For example, there may be further provided a data generating device that generates additional sequence data in which a display start timing, an operation timing, and information indicating each operation reference portion are associated with one another for each object based on basic sequence data in which only an operation timing is indicated without distinction between previously prepared operation reference portions or the like. And, in the routines of FIGS. 9 to 11, the additional sequence data may be used. Further, in this case, the control unit 10 may be configured so as to function as the data generating device. FIG. 12 is a diagram illustrating an example of the basic sequence data in which only an operation timing is indicated. The basic sequence data 80 includes a vertical axis 81 representing an elapsed time (the progress of music). As the vertical axis 81 proceeds upward, an elapsed time increases. Further, the vertical axis 81 is provided with a plurality of horizontal lines 83 set at predetermined time intervals. As illustrated in FIG. 12, in the basic sequence data 80, a block 85 is arranged at an appropriate timing according to the progress of the music. Each block 85 represents an operation timing.

Figure 13:
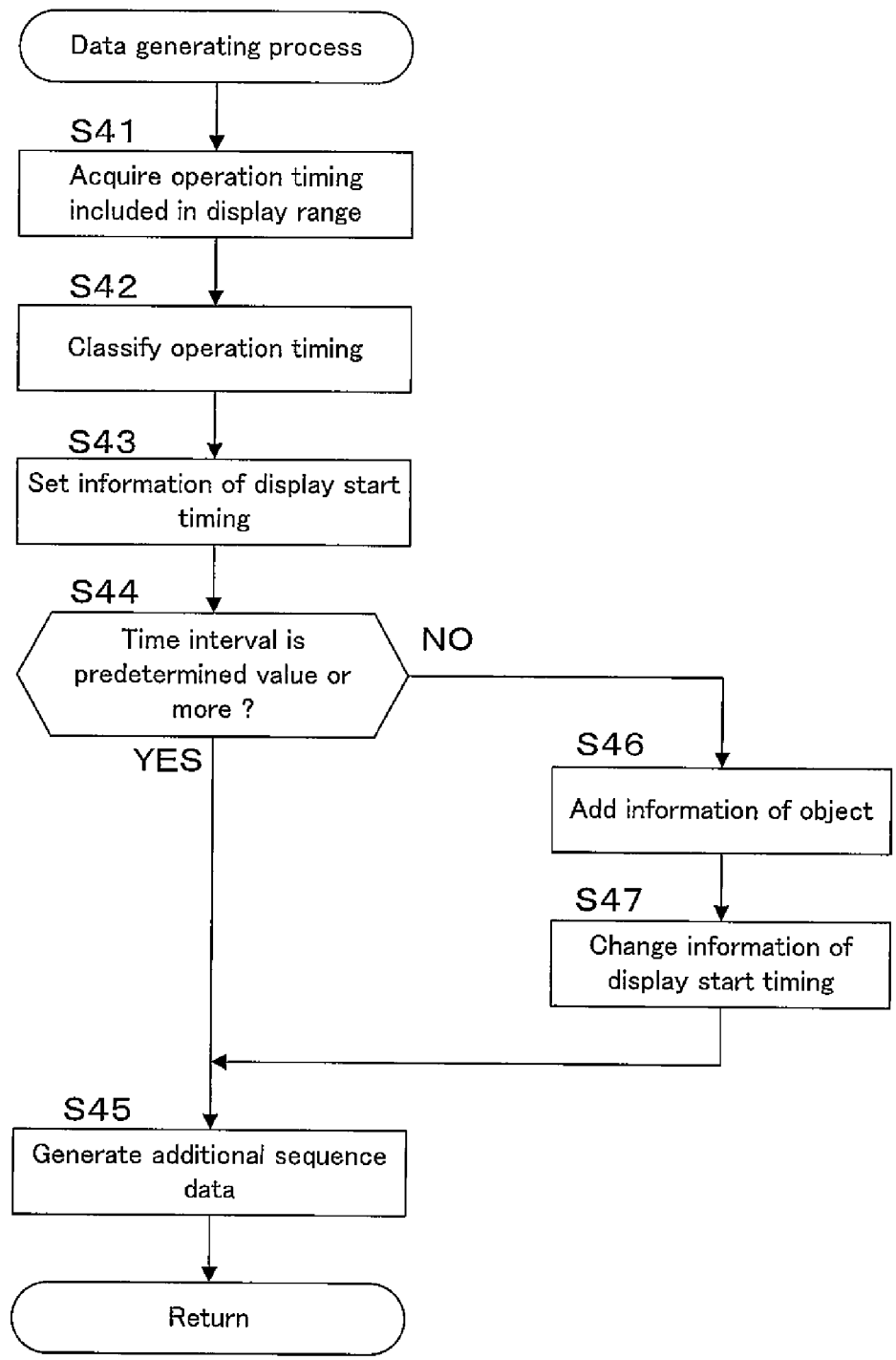
FIG. 13 is a diagram illustrating an example of a flowchart of a data generating process routine.
Figure 14:
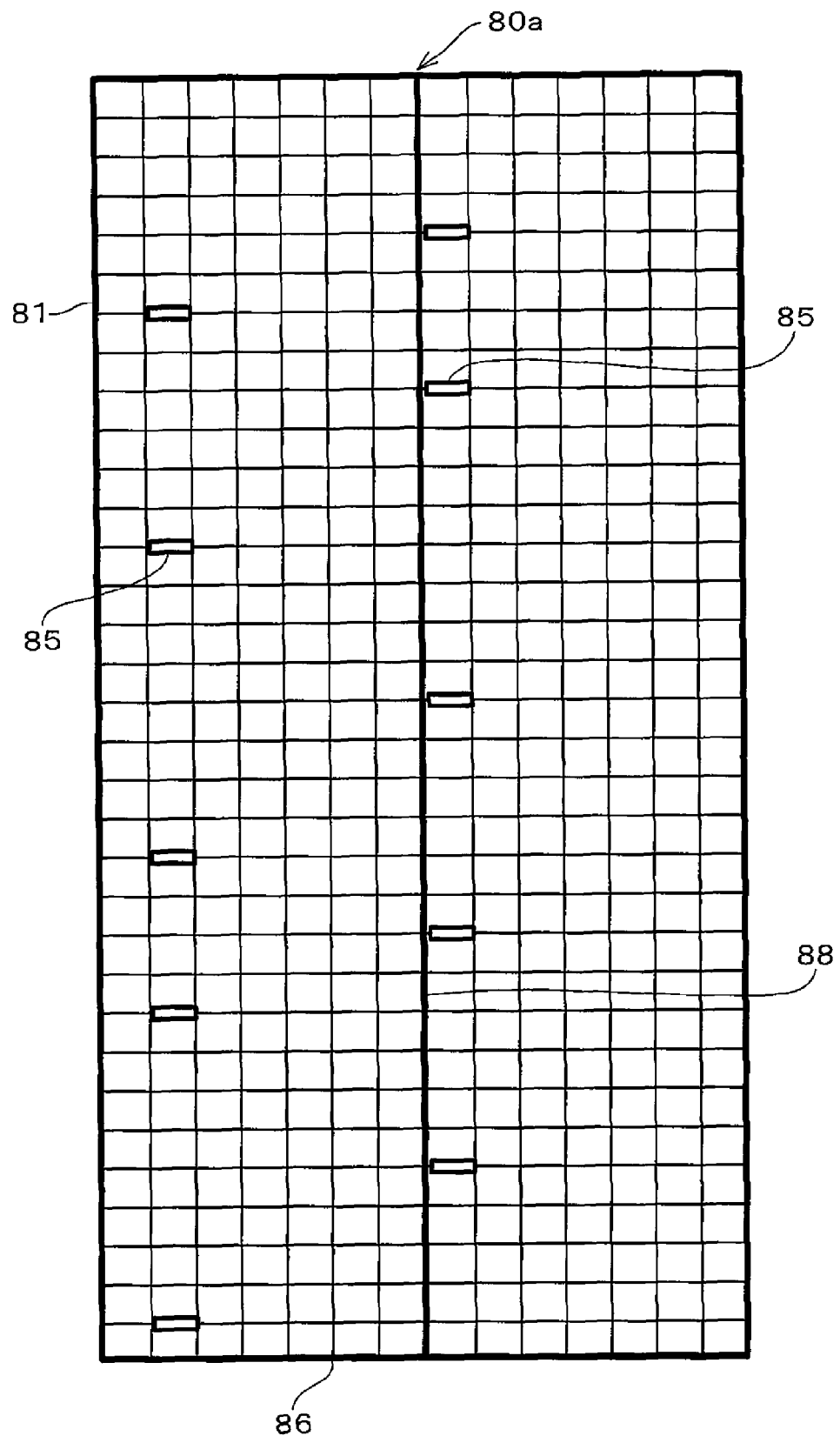
FIG. 14 is a diagram illustrating an example of sequence data in which each operation timing is sorted according to each operation reference portion.

Meanwhile, FIG. 13 is a diagram illustrating an example of a data generating process routine of generating the additional sequence data, which is executed by the control unit 10 when the control unit 10 functions as the data generating device. When the data generating process routine of FIG. 13 starts, in step S41, the control unit 10 first acquires an operation timing included in the display range from the basic sequence data 80. Next, in step S42, operation timings indicated by the basic sequence data 80 are classified according to each of the operation reference portions 55A and 55B, and the operation timings are sorted so that an operation timing for the first operation reference portion 55A and an operation timing for the second operation reference portion 55B can come in an alternating manner. Specifically, information indicating each of the operation reference portions 55A and 55B is added to the basic sequence data, and each operation timing is associated with information of each of the operation reference portions 55A and 55B so that an operation timing for the operation reference portion 55A and an operation timing for the operation reference portion 55B can come in the alternating manner. FIG. 14 is a diagram illustrating an example of sequence data 80a (which may be hereinafter referred to as "sorting data") in which each operation timing is sorted according to each of the operation reference portions 55A and 55B. The sorting data 80a includes a horizontal axis 86 which is disposed with respect to the vertical axis 81 representing the lapse of a time and a thick line 88 which is disposed at the center of the horizontal axis 86 and extends in parallel to the vertical axis 81. The thick line 88 divides the horizontal axis 86 in units of operation reference portions. And, the left side of the thick line 88 is used as a first region indicating the first operation reference portion 55A, and the right side is used as a second region indicating the second operation reference portion 55B. As illustrated in FIG. 14, in the sorting data 80a, the blocks 85 are alternately arranged on the regions of the operation reference portions 55A and 55B with the lapse of a time.

Figure 15:
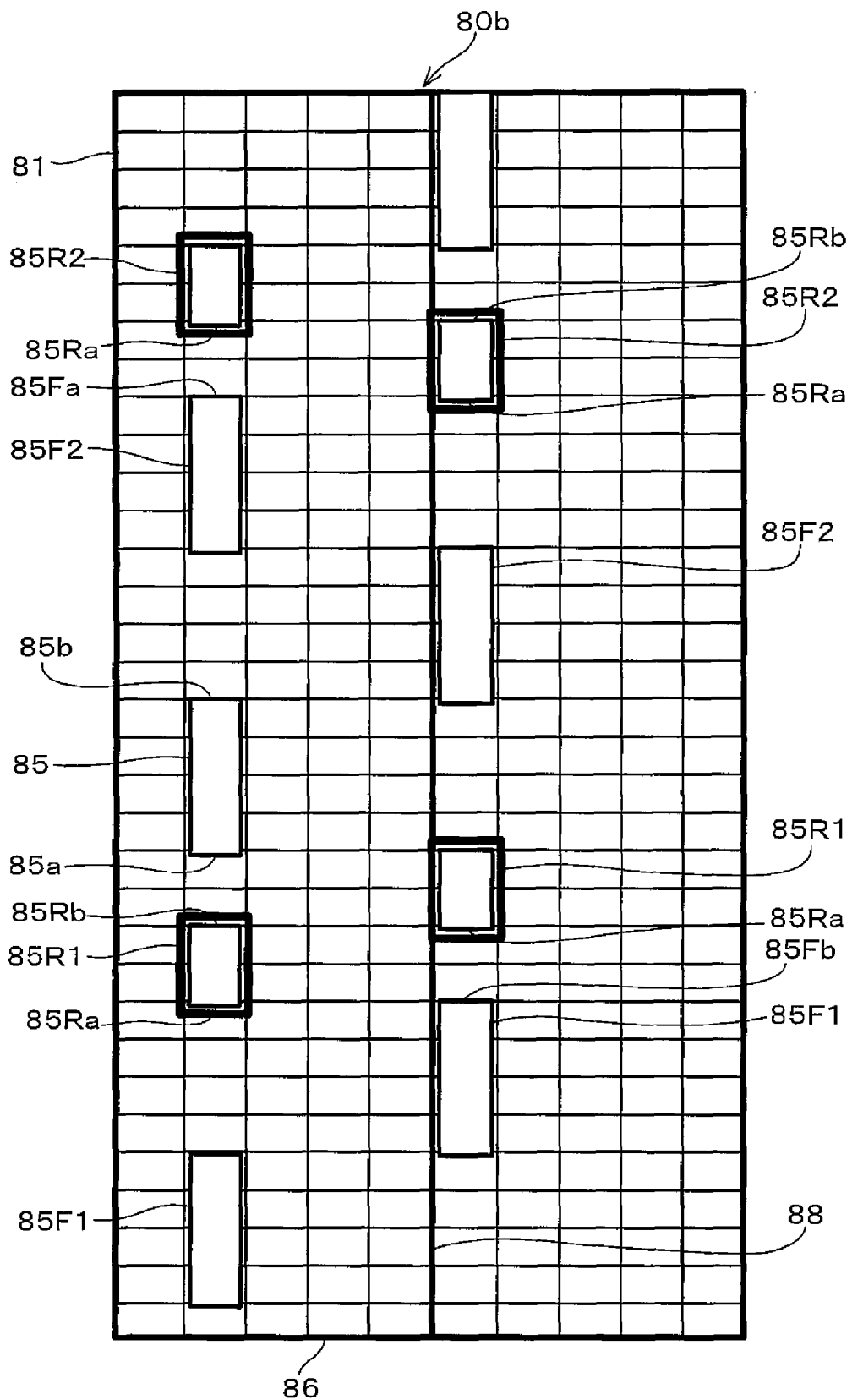
FIG. 15 is a diagram illustrating an example of sequence data in which information of a display start timing is set.

Referring back to FIG. 13, in step S43, information indicating a display start timing of the object 60 corresponding to each operation timing is set on each operation timing. The display start timing is set based on an operation timing immediately prior to each operation timing. Specifically, as a display start timing on a certain operation timing, an operation timing immediately prior to the certain operation timing is specified, and the timing corresponding to the immediately previous operation timing is set. FIG. 15 is a diagram illustrating an example of sequence data 80b (which may be hereinafter referred to as "display start timing data") in which information of the display start timing is set to the sorting data 80a. As illustrated in FIG. 15, in the display start timing data 80b, one end 85a of each block 85 arranged at an operation timing of the sorting data 80a extends up to the position corresponding to the other end 85b of the block 85 arranged immediately before each block 85. In other words, in the display start timing data 80b, one end 85a of each block 85 is set as information indicating the display start timing, and the other end 85b is set as information indicating the operation timing.

Referring back to FIG. 13, in step S44, a time interval between operation timings is calculated, and it is determined whether or not the time interval between the operation timings is a predetermined value or more. Specifically, a time interval between a certain operation timing and a next operation timing is calculated, and it is determined whether or not the time interval is equal to or more than the predetermined value during which the operation timing can be appropriately guided to each player. When a positive determination is made in step S44, that is, when it is determined that a time interval between each pair of all objects 60 included in the display range is the predetermined value or more, the process proceeds to step S45.

In contrast, when a negative determination is made in step S44, that is, when it is determined that an operation timing having a time interval less than the predetermined value is included, the process proceeds to step S46. In step S46, a certain operation timing determined that the time interval is less than the predetermined value and a next operation timing are specified, and information indicating an object 60 different from the object 60 corresponding to the specified certain operation timing is added to the specified next operation timing. Next, in step S47, information of the display start timing set to the specified next operation timing is changed such that the display start timing corresponding to the next operation timing specified in step S46 matches the display start timing set to the operation timing prior to the specified certain operation timing.

Figure 16:
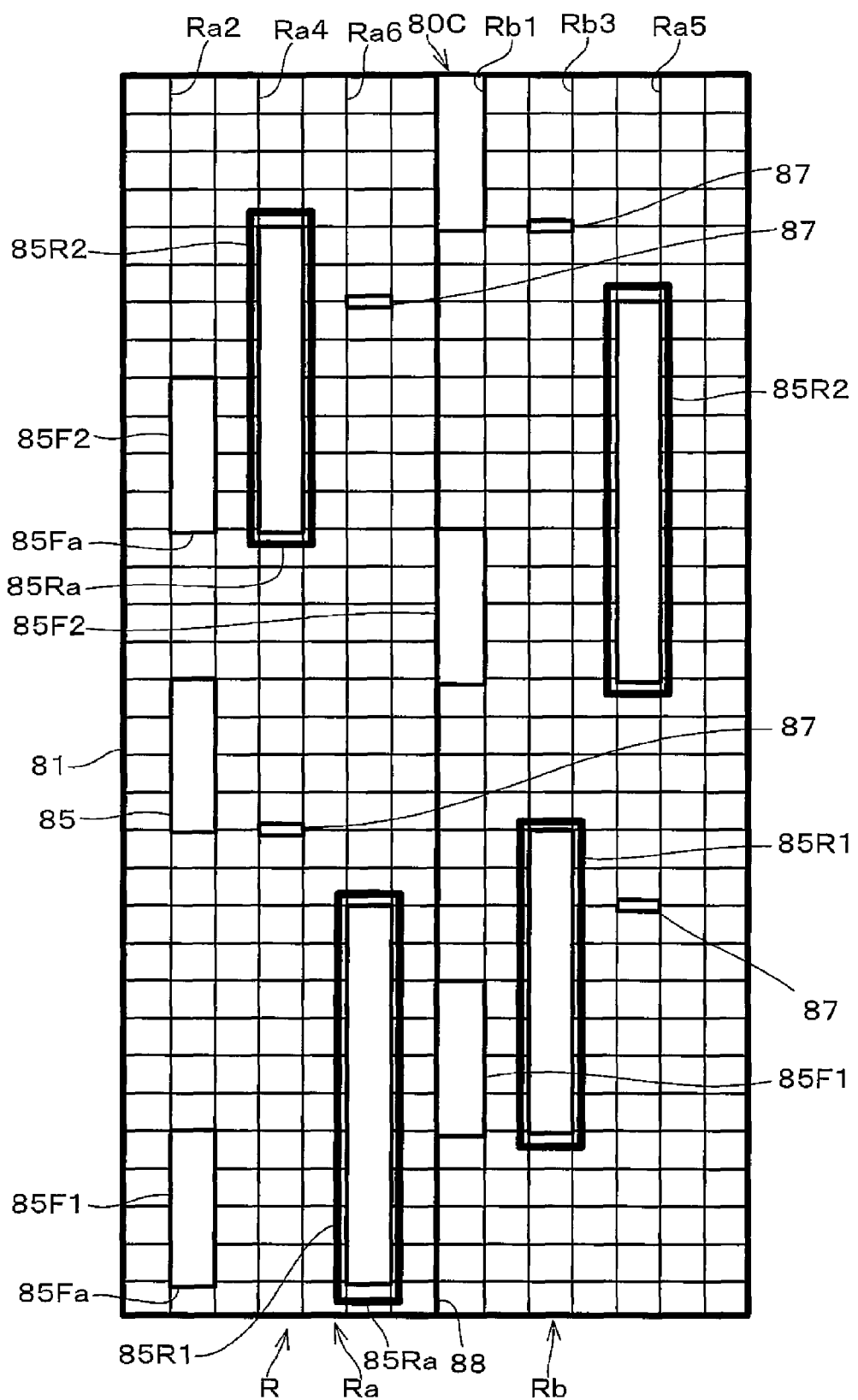
FIG. 16 is a diagram schematically illustrating a first modified example of sequence data.

FIG. 16 is a diagram illustrating an example of the sequence data 80c (which may be hereinafter referred to as "adjustment data") in which information indicating the object 60 is added to the display start timing data 80b, and information of the set display start timing is changed. As illustrated in FIG. 16, a plurality of lanes R are provided on the horizontal axis 86 of the adjustment data 80c. Each lane R is used as information indicating the object 60. Further, the plurality of lanes R are divided into a plurality of lanes Ra of the first region included in the region of the first operation reference portion 55A and a plurality of lanes Rb of the second region included in the region of the second operation reference portion 55B with the thick line 88 as the boundary. A correspondence relation having the object 60 as a common term is present between each lane Ra of the first region and each lane Rb of the second region. Specifically, the second lane Ra2 from the left of the region of the first player is used as information indicating a display of a first object 60, a fourth lane Ra4 from the left thereof is used as information indicating a display of a second object 60, and a sixth lane Ra6 from the left thereof is used as information indicating a display of a third object 60. In addition, the second lane Ra2 from the left of the region of the first player has a correspondence relation with a first lane Rb1 from the left of the region of the second player, the fourth lane Ra4 from the left of the first player has a correspondence relation with a third lane Rb3 from the left of the second player, and the sixth lane Ra6 from the left of the first player has a correspondence relation with a fifth lane Rb5 from the left of the second player. In other words, in the examples of FIGS. 5 to 7, the second lane Ra2 from the left of the region of the first player and the first lane Rb1 from the left of the second player indicate a display of the object 60 or the first object 60a, the fourth lane Ra4 from the left of the first player and the third lane R32 from the left of the second player indicate a display of the second object 60b, and the sixth lane Ra6 from the left of the first player and the fifth lane Rb5 from the left of the second player indicate a display of the third object 60c.

In the examples of FIGS. 15 and 16, among operation timings in which a time interval between a certain operation timing and an operation timing subsequent to the certain operation timing is less than the predetermined value, a next block 85R corresponding to the next operation timing is surrounded by a thick line. When the display start timing data 80b illustrated in FIG. 15 is compared with the adjustment data 80c illustrated in FIG. 16, each of the next blocks 85R1 and 85R2 surrounded by the thick lines in the display start timing data 80b has moved onto another lane in the adjustment data 80c. Specifically, in time-series order from the front side, the next two blocks 85R1 and 85SR2 of the first area of FIG. 15 have moved onto the sixth lane Ra6 and the fourth lane Ra4 in FIG. 16, respectively. Further, in time-series order from the front side of FIG. 15, the next two blocks 85R1 and 85R2 of the second area have moved onto the third lane Rb3 and the fifth lane Rb5 in FIG. 16, respectively.

Further, in the display start timing data 80b, the position of one end 85Ra of each of the next blocks 85R1 and 85R2 also has changed. Specifically, in the display start timing data 80b, the position of one end 85Ra of the next block 85R1 of the first area corresponds to the position of the other end 85Fb of the previous block 85F1 which is positioned in front of the next block 85R1 of the second area. Similarly, the position of one end 85Ra of the next block 85R1 of the second area corresponds to the position of the other end 85Rb of the next block 85R1 of the first area, the one end 85Ra of the next block 85R2 of the second area corresponds to the position of the other end 85Fb of the previous block 85F2 which is positioned in front of the next block 85R2 of the first area, and the position of one end 85Ra of the next block 85R2 of the first area corresponds to the position of the other end 85Rb of the next block 85R2 of the second area, respectively (in the following, when the previous blocks 85F1 and 85F2 need not be distinguished from each other, the previous blocks 85F1 and 85F2 are collectively referred to as a "previous block 85F"). In other words, in the display start timing data 80b, the position of one end 85Ra of each next block 85R corresponds to the position of the other end 85b of the block 85 which is positioned immediately before the next block 85R in time series. Thus, each next block 85R is short in the length from the position of one end 85Ra representing the display start timing to the position of the other end 85Rb representing the operation timing.

Meanwhile, in the adjustment data 80c, one end 85Ra of each of the next blocks 85R1 and 85R2 extends in a temporally retroactive direction so as to correspond to one end 85Fa of each of the previous blocks 85F1 and 85F2 which is positioned immediately in front of each next block in the same region as each of the next blocks 85R1 and 85R2, that is, correspond to one end 85Fa of each of the previous blocks 85F1 and 85F2 which is positioned two blocks ahead in time series. For this reason, each of the next blocks 85R1 and 85R2 is longer in the length from position representing the display start timing of one end 85Ra to the position representing the operation timing of the other end 85Rb than the display start timing data 80b. As a result, in the adjustment data 80c, an instruction is made such that an object 60 different from each of the previous blocks 85F1 and 85F2 is separately displayed at a display start timing of an object 60 corresponding to each of the previous blocks 85F1 and 85F2 which is positioned one block ahead in time series in the same region as each of the next blocks 85R1 and 85R2. In other words, in the adjustment data 80c, an instruction is made such that two objects 60 of an object 60 corresponding to a previous block 85F and an object 60 corresponding to a next block 85R are displayed at a display start timing corresponding to the previous block 85F, and the objects 60 arrive at the operation reference portions 55A and 55B corresponding to the blocks 85F and 85R at operation timings indicated by the blocks 85F and 85R, respectively. Incidentally, the operation timing corresponding to the next block 85R corresponds to the next operation timing 28cr of the sequence data 28, and the operation timing corresponding to the previous block 85F corresponds to the previous operation timing 28cf of the sequence data 28. Further, the operation timing corresponding to the previous block 85F1 of the next block 85R1 of the second area also functions as the certain operation timing 28cs corresponding to the next block 85R1 of the first area. Similarly, the operation timing corresponding to the next block 85R1 of the first area functions as the certain operation timing 28cs corresponding to the next block 85R1 of the second area, the operation timing corresponding to the previous block 85F2 of the next block 85R2 of the first area functions as the certain operation timing 28cs corresponding to the next block 85R2 of the second area, and the operation timing corresponding to the next block 85R2 of the second area functions as the certain operation timing 28cs corresponding to the next block 85R2 of the first area, respectively.

Referring back to FIG. 13, in step S45, the display start timing data 80b or the adjustment data 80c is generated as the additional sequence data based on the result of step S43 and the result of step S47, and then the current routine ends. Incidentally, in the above-described example, the additional sequence data is generated for each display range, but the data generating process routine may be executed on the entire basic sequence data 80 by a single process.

The above-described embodiments have been described in connection with the embodiment in which the control unit 10 functions as the data generating device, but the present invention is not limited to this embodiment. For example, a computer separate from the game machine 1 may be prepared and function as the data generating device by executing the routine of FIG. 13. Preferably, the computer includes a device storing the basic sequence data 80 and is configured to execute the routine of FIG. 13.

In the above-described embodiments, the sequence data 28 in which the display start timing, the operation timing, and the information indicating each of the operation reference portions 55A and 55B are described by a numerical value or a letter for each object 60 is stored in the external storage device 20, but the sequence data stored in the external storage device 20 is not limited to this embodiment. For example, as a first modified example of the sequence data, the above-described separately generated adjustment data 80c may be stored in the external storage device 20. Incidentally, in the example of FIG. 16, in the adjustment data 80c, a special block 87 with a predetermined size smaller than a normal block 85 is provided in order to render disappearance of the second object 60. Each special block 87 is provided to correspond to an operation timing of the second or third object 60 and indicates the rendition of disappearance of a target object 60 at an operation timing. However, the special block 87 may not be provided. Further, for example, as a second modified example of the sequence data, sequence data illustrated in FIG. 17 may be stored in the external storage device 20.

Figure 17:
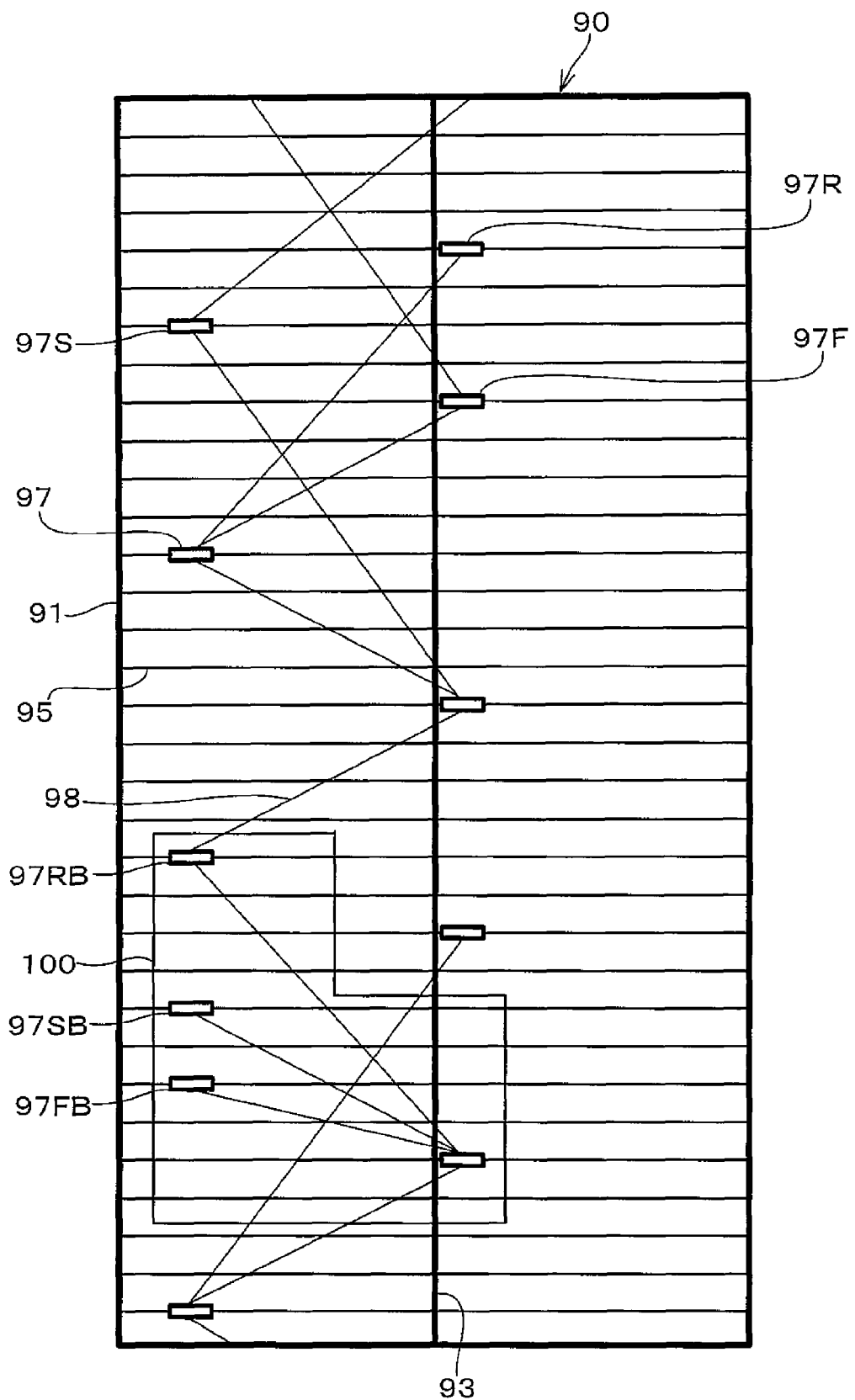
FIG. 17 is a diagram schematically illustrating a second modified example of sequence data.

FIG. 17 is a diagram schematically illustrating the second modified example of the sequence data. In sequence data 90 illustrated in FIG. 17, a vertical axis 91 represents an elapsed time (the progress of music), and a central thick line 93 represents the boundary between indications of each of the operation reference portions 55A and 55B, respectively. As the vertical axis 91 proceeds upward, an elapsed time increases. And, the left side of the thick line 93 is used as a region representing the first operation reference portion 55A, and the right side thereof is used as a region representing the second operation reference portion 55B, respectively. Further, the vertical axis 91 is provided with a plurality of horizontal lines 95 set at predetermined time intervals. The sequence data 90 includes a plurality of blocks 97 each indicating an operation timing. Each block 97 is arranged at an appropriate timing of a region of each operation indicating unit in tune with the progress of music. Further, the blocks 97 are connected with each other by a connecting line 98. The connecting line 98 represents a correspondence relation between the objects 60 each indicating an operation timing. Specifically, when one connecting line 98 extends from a certain block 97 to a next block 97, made is an instruction to display one object 60 for movement from the operation reference portion 55A or 55B corresponding to the certain block 97 to the operation reference portion 55A or 55B corresponding to the next block 97. Meanwhile, when two connecting lines 98 extend from a certain block 97 to next two blocks 97, made is an instruction to display two objects in order to indicate two operation timings indicated by the two next blocks 97 for movement from the operation reference portion 55A or 55B corresponding to the certain block 97 to the operation reference portion 55A or 55B corresponding to the two next blocks 97. Further, the connecting line 98 represents continuity of an object 60 corresponding to each object 60. In other words, the connecting line 98 represents a relation in which the arrival position of the object 60 corresponding to the block 97 serving as the starting point of the connecting line 98 in time series functions as a starting position of movement of the object 60 corresponding to the block 97 serving as the ending point of the connecting line 98. For this reason, the object 60 corresponding to the block 97 that does not serve as the starting point of the connecting line 98 disappears from the game screen with the advent of an operation timing. In this modified example, the starting point of the connecting line 98 functions as information indicating the display start timing. Further, of ending points of the two connecting lines 98 extending from one block 97, one block 97F whose operation timing comes first corresponds to the previous operation timing 28cf in the sequence data 28, and the other block 97R whose operation timing comes late corresponds to the next operation timing 28cr. The display start timings of the two blocks 97F and 97R, that is, the starting points of the connecting lines 98 are the same. And, a specific block 97S arranged to indicate an operation timing between the blocks 97F and 97R while interposing the thick line 93 at the center between the one block 97F and the other block 97R corresponds to the certain operation timing 28cs. Incidentally, the number of the connecting lines 98 extending from the certain block 97 is not limited to one or two, and three or four connecting lines 98 may be provided as necessary. The present invention can be actualized by this modified example.

In the example of FIG. 17, the three connecting line 98 extending from the certain block 97 are surrounded by a thick line 100. The example of FIG. 17 in which the connecting lines 98 are surrounded by the thick line 100 represents that both the previous block 97FB prior to the specific block 97SB representing the certain operation timing and the next block 97R subsequent to the specific block 97S are shorter than the predetermined value. And, in this example, the connecting lines 98 are provided such that the objects 60 respectively corresponding to the three blocks 97RB, 97SB, and 97FB are the same in display start timing as the previous block 97FB. Thus, in the data of FIG. 17, at the display start timing of the object 60 corresponding to the previous block 97FB, the two objects 60 respectively corresponding to the certain block 97SB and the next block 97RB are also displayed in addition to the object 60 at the position at which the object 60 starts to be displayed. In other words, an instruction is made such that the three objects 60 are simultaneously displayed at the same place, and a movement display is performed to indicate operation timings respectively corresponding to the next block 97RB, the specific block 97SB, and the previous block 97FB. As described above, as far as a display start timing of an operation indication mark corresponding to each operation timing can be extended so that a time interval between operation timings does not become less than the predetermined value, the number of objects 60 to be displayed and a display start timing of each object 60 are not limited to the above-described embodiments.

The above-described embodiment has been described in connection with the embodiment in which five paths W extend from one rebounding point R1 or R2. However, the number of paths extending each rebounding point is not limited. Thus, it is possible to set a number of paths omnidirectionally extending from each rebounding point. Further, it is possible to set a number of rebounding points R1 or R2 included in the operation reference portion 55A or 55B. In other words, a plurality of paths may be set such that the operation indication mark is omnidirectionally movable between the operation reference portions at all positions. Furthermore, a number of rebound points with both side walls 52R and 52L of the game region 52 and a number of paths starting from the rebound point may be set. Through this operation, a number of paths up to the rebound point and a number of paths after rebounding can be set. Further, the above-described embodiment has been described in connection with the embodiment in which the object 60 is divided into four regions, the moving path is decided by comparing the position of the touch operation with the four regions of the object 60. However, the present invention is not limited to this embodiment. The operation indication mark may be divided into a number of regions according to a number of paths set to a game region. Thus, it is possible to cause the operation indication mark to move along a free path between the operation reference portions through the touch operation. Further, the present invention is not limited to the embodiment in which the operation indication mark is divided into a plurality of regions. For example, the moving path of the operation indication mark may be decided by comparing a fixed position such as the center position of the operation indication mark with the position of the touch operation. Further, when a number of paths are set as a moving path of an operation indication mark, so that the moving velocity of the operation indication mark does not become too fast to be appropriate for an operation indication, a limiting device that limits a change of a moving path according to a touch operation to a path in which the moving velocity of the operation indication mark falls within the predetermined range may be further provided. In this case, the control unit 10 may be configured to function as the limiting device. When the control unit 10 is configured so as to function as the limiting device, for example, in step S18 of the path decision process routine illustrated in FIG. 10, selection of a path is preferably limited to a predetermined path in which the moving velocity is within the predetermined range based on a relation between an operation timing and a moving distance. Further, separately, the control unit 10 may be configured so as to execute a path correcting process routine of correcting a path decided by path deciding process.

Figure 18:
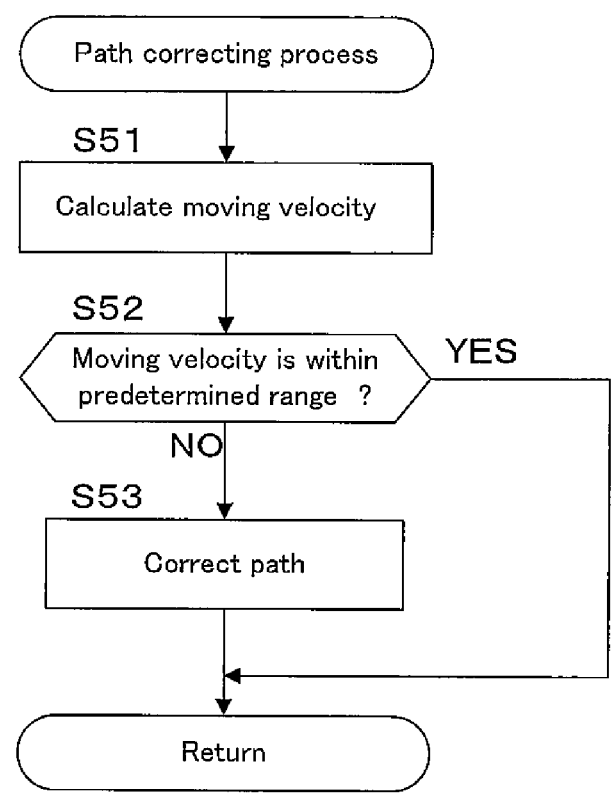
FIG. 18 is a diagram illustrating an example of a flowchart of a path correcting process routine.

FIG. 18 is a diagram illustrating an example of a path correcting process routine executed by the control unit 10 when the control unit 10 functions as the limiting device. Preferably, the path correcting process of FIG. 18 is executed, for example, between steps S3 and S4 of the sequence process routine of FIG. 9, that is, after a path is decided by the path deciding process of step S3. When the routine of FIG. 18 starts, in step S51, the control unit 10 first acquires the decided path and an operation timing to be indicated by a target object 60, and calculates the moving velocity of the object 60 based on the distance of the acquired path and the operation timing. Next, in step S52, it is determined whether or not the moving velocity calculated in step S51 is within the predetermined range. When a positive determination is made in step S52, the subsequent process is skipped, and then the current routine ends. In contrast, when a negative determination is made in step S52, the process proceeds to step S53. In step S53, the decided path is corrected to a path in which the moving velocity of the object 60 falls within the predetermined range, and then the current routine ends. Further, when the path is corrected by the path correcting process, in the process of step S4 and subsequent steps of FIG. 9, the path corrected by the path correcting process is preferably used in the routine of FIG. 9.

In the above-described embodiments, a moving path along which an object 60 moves toward a next operation reference portion is decided according to the positional relation between the position of a touch operation and the position of the object 60, but decision of the moving path is not limited to the embodiment according to the positional relation. For example, the moving path may be decided according to an operation designating a direction such as an operation in which the position of a touch operation continuously changes, and the moving velocity may be decided according to a change velocity of the continuous change. Further, when a specific operation designating a predetermined moving direction and a predetermined velocity is executed on an object together with a touch operation on an operation reference portion, a specific moving path according to the specific operation may be set as the moving path of the object 60, and the object may move along the specific moving path. A configuration in which the object 60 moves along the specific path when the specific operation is executed can be actualized, for example, by executing the routine of FIG. 19 through the sequence processing unit 15.

Figure 19:
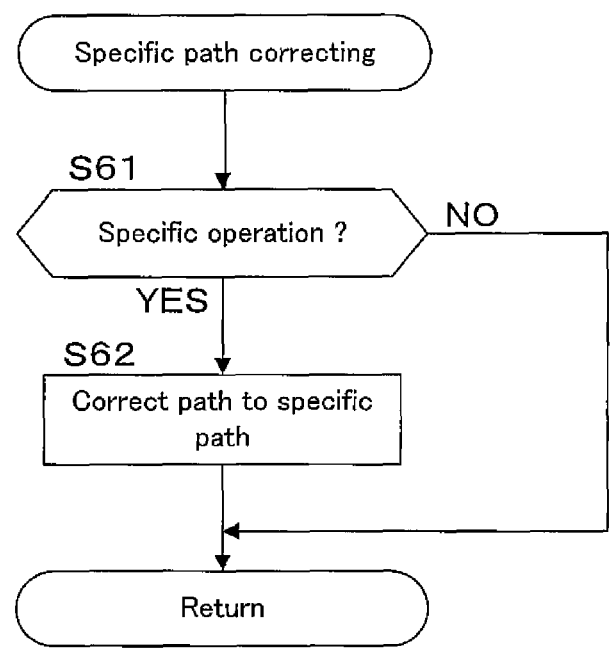
FIG. 19 is a diagram illustrating an example of a flowchart of a specific path correcting routine.

FIG. 19 is a diagram illustrating an example of a flowchart of a specific path correcting routine. Preferably, the routine of FIG. 19 is executed, for example, between steps S3 and S4 of the sequence process routine of FIG. 9, that is, after a path is decided by the path deciding process of step S3. When the routine of FIG. 19 starts, in step S61, the sequence processing unit 15 determines whether or not the specific operation has been executed. For example, this determination is performed as follows. First, a continuous change in the position of a touch operation is determined with reference to a signal from the touch panel 5. When the position of the touch operation does not continuously change, it is determined that the specific operation has not been executed. In contrast, when the position of the touch operation continuously changes, the direction and the velocity of the continuous change are calculated. Then, by comparing the calculated change direction with a predetermined direction and the calculated velocity with a predetermined velocity, respectively, it is determined whether or not the specific operation has been executed. When it is determined in step S61 that the specific operation has not been executed, the sequence processing unit 15 skips the subsequent process and then ends the current routine.

In contrast, when it is determined in step S61 that the specific operation has been executed, the sequence processing unit 15 proceeds to step S62. In step S62, the sequence processing unit 15 corrects the path decided in step S3 to a specific path, and then ends the current routine. In the process of step S4 and subsequent steps of FIG. 9, the object 60 can move along the specific path by using the processing result of FIG. 19 when the specific operation has been executed.

Figure 20:
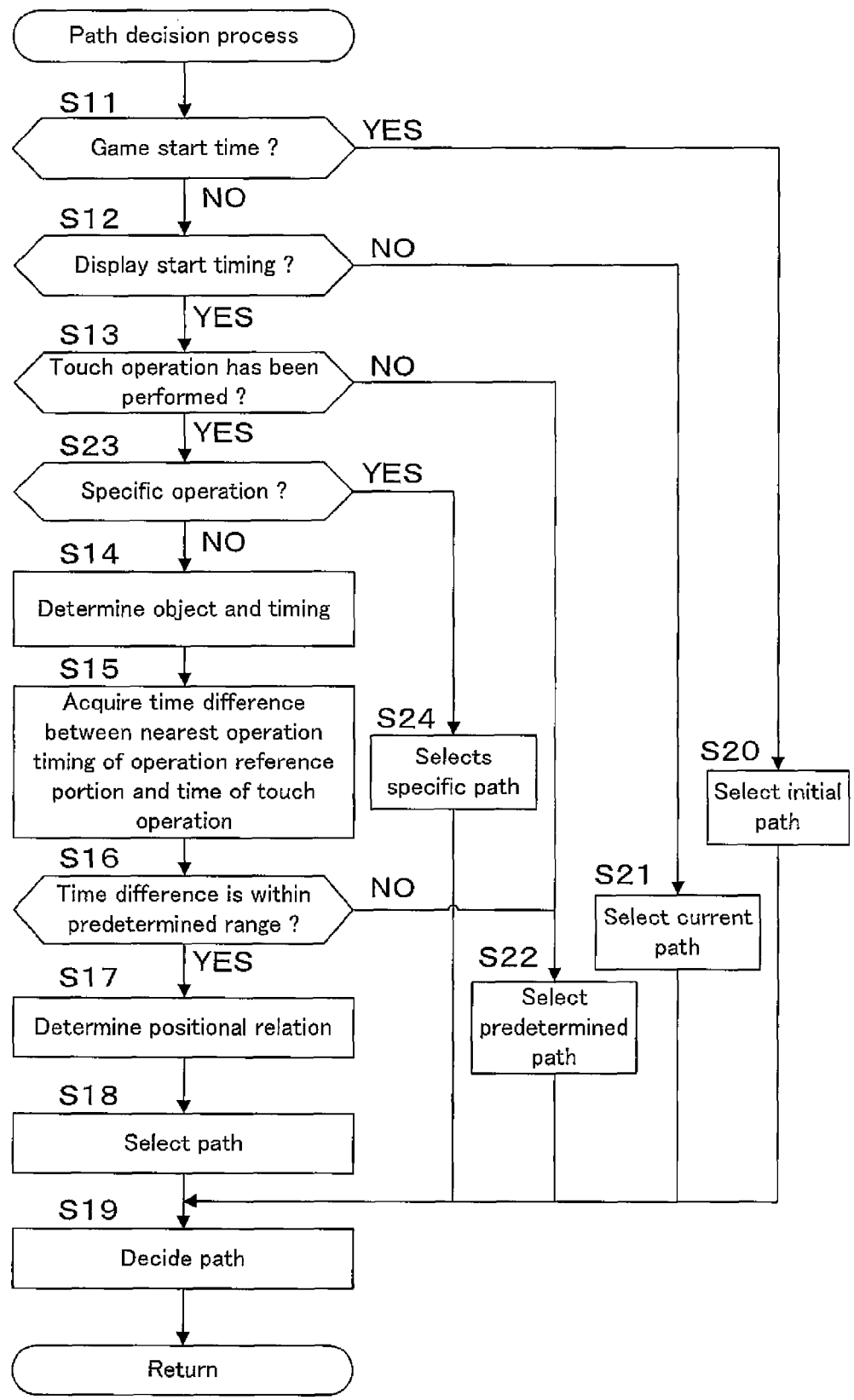
FIG. 20 is a diagram illustrating an example of a flowchart of a path decision process routine when the presence or absence of a specific operation is determined.

Alternatively, as a configuration to cause the object 60 to move along the specific path when the specific operation has been executed, for example, a routine of FIG. 20 may be executed instead of the routine of FIG. 10. FIG. 20 is a diagram illustrating an example of a path decision process routine when the presence or absence of the specific operation is determined. Comparing the routine of FIG. 10 with the routine of FIG. 20, in the routine of FIG. 20, the process of step S23 is performed before step S14 in addition to the routine of FIG. 10. When the routine of FIG. 20 is executed, after step S13, the sequence processing unit 15 proceeds to step S23. In step S23, it is determined whether or not the specific operation has been executed. This determination may be performed in a similar manner to step S61 of the routine of FIG. 19.

When a negative determination is made in step S23, the sequence processing unit 15 proceeds to step S14. The subsequent process may be performed similarly to the process of FIG. 10. In contrast, when a positive determination is made in step S23, the sequence processing unit 15 proceeds to step S24. In step S24, the sequence processing unit 15 selects a specific path as the moving path of the object 60 and then proceeds to step S19. Next, the process of step S19 may be configured similarly to the process of FIG. 10. In this case, the specific path can be decided as the moving path of the object 60 according to the specific operation.

Incidentally, as the specific operation designating a predetermined moving direction and a predetermined velocity on an object, there may be employed various embodiments. For example, there may be employed an operation of touching an object 60 moving toward an operation reference portion on the operation reference portion (the object 60 instantaneously becomes a hold state) and then pushing the object 60 in this state to move in a predetermined direction (continuously changing the position of the touch operation in the touched state). Further, as the specific operation, there may be employed a smash operation of touching the front side of the operation reference portion and causing the position of the touch operation to slide from the touched position toward the object 60 of the operation reference portion in the touched state such that the position of the touch operation overlaps a ball at a timing at which the operation reference portion matches with the object 60. Further, alternatively, a time between the start and the end of a touch operation (between contact of the player's finger or the like and the end of the contact) is calculated on the touch operation on the operation reference portion 55A or 55B, as the specific operation, there may be used a positional relation as information indicating a predetermined direction (for example, a touched region among the four regions S, L, R, and O) between the position of the touch operation and the position of the object 60, and a time of the calculated touch operation as information indicating a predetermined velocity. In this case, for example, it can be determined whether or not the predetermined velocity has been designated by determining whether or not the time of the touch operation is shorter than the predetermined value under the assumption that as the shorter the time of the touch operation is, the higher the designated velocity is. Even in any of the above examples, it is possible to determine an indication of a direction and a velocity on the object 60.

Figure 21:
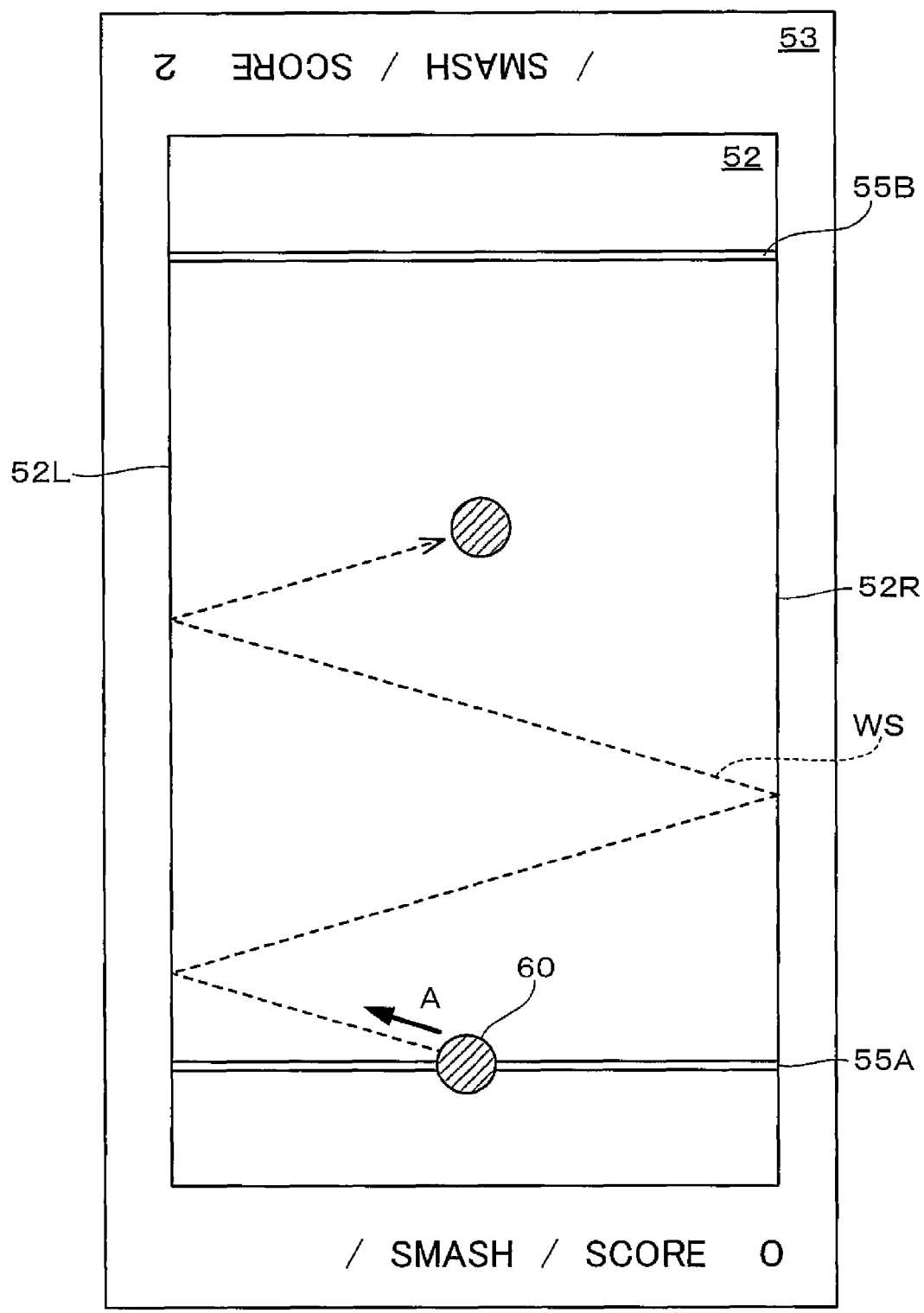
FIG. 21 is a diagram schematically illustrating an example of a specific path when a specific operation is performed.

Further, for example, a path of a predetermined distance or more in which the moving velocity of the object 60 is the predetermined value or more may be used as the above-described specific path. FIG. 21 is a diagram schematically illustrating an example of the specific path when the specific operation is performed. In FIG. 21, an arrow A represents an operation direction. The example of FIG. 21 illustrates a case that an arrival position of the object 60 is touched in tune with an arrival of the object 60 at the first operation reference portion 55A, and an operation position is changed in an arrow A direction at a predetermined velocity in the touched state. In this case, it is determined that the specific operation designating the velocity has been executed in the predetermined direction, and thus the object 60 moves along the path WS of the predetermined distance or more as the specific path toward the second operation reference portion 55B at the opposite side while rebounding from both side walls 52L and 52R extending in the longitudinal direction of the game region 52 twice or more. As a result, for example, the smash operation of pushing the object 60 at a high speed is determined, and thus it is possible to increase the moving velocity of the object 60 to be a predetermined value or more according to the operation. In this case, since an option of intentionally moving an object toward an opponent player at a high speed can be prepared, options of the game can be widened, and amusement of the game can be improved.

Further, in the above-described embodiments, the moving path of the object 60 changes according to the touch operation, but the present invention is not limited to the configuration in which the moving path changes according to the player's operation. For example, the moving path may change according to the development or rendition of a game. In other words, the moving path of the object may change by a predetermined condition such as an operation on the operating unit, or the development or rendition of a game. For the rendition of a game, as an example in which the moving path of the object 60 changes, the moving path of the object 60 may be decided according to a time interval between a certain operation timing and a next operation timing. In this case, instead of the determination on the presence or absence of the above-described specific operation, it may be determined whether or not a time interval between a certain operation timing and a next operation timing is a predetermined value or more, and instead of the specific path selected when the specific operation is performed, a path in which the moving distance is a certain distance or more may be selected as the moving path. For example, by applying a predetermined value in which a time interval between a certain operation timing and a next operation timing gives a monotonous impression as the predetermined value or more, it is possibly to move the object 60 at the velocity of a predetermined value or more at the time interval. As a result, the operation interval is increased, and thus the development of the game can be prevented from being monotonous.

Figure 22:
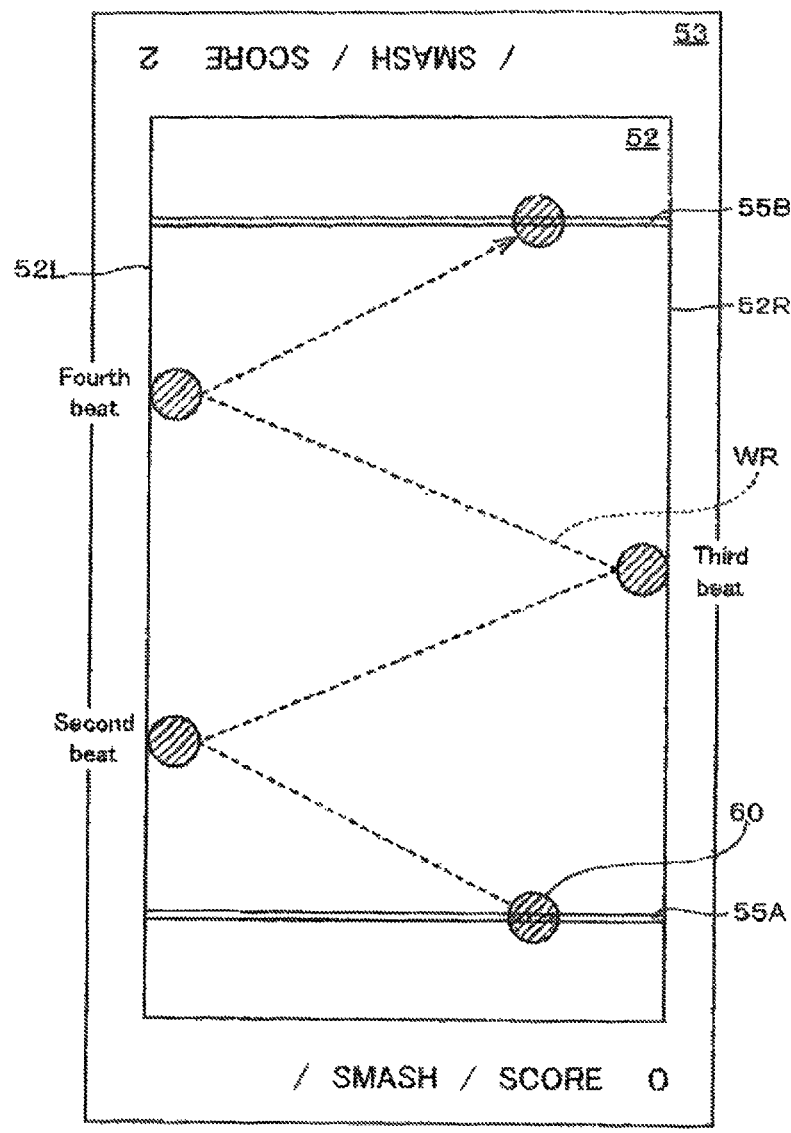
FIG. 22 is a diagram schematically illustrating an example of a path in which a moving distance of an object is a certain distance or more.

Furthermore, a path in which a moving direction changes at predetermined intervals may be used as the path having a certain distance or more. FIG. 22 is a diagram schematically illustrating an example of a path in which a moving distance of an object 60 is the certain distance or more. In the example of FIG. 22, a path WR along which an object moves toward the second operation reference portion 55B at the opposite side while rebounding from both side walls 52L and 52R extending in the longitudinal direction of the game region 52 at a timing according to a rhythm of music is used as the path having the certain distance or more. Further, in the example of FIG. 22, a beat of the music is used as the rhythm of the music, and an object rebounds from the right side wall 52R of the game region 52 at a second beat and a fourth beat, rebounds from the left side wall 52L at a third beat, and then arrives at the second operation reference portion 55B. Rebound points of both side walls 52L and 52R of the game region 52 are decided such that the number of rebounding times is calculated based on the beat number present between a certain operation timing and a next operation timing, and points at which rebounding can be performed by the calculated number of times while securing a certain distance or more are calculated. And, a path connecting the calculated rebound points is selected as the path having the certain distance or more. As a result, movement can be performed at the velocity of the predetermined value or more, and rebounding can be rendered in tune with the beat of the music. Thus, it is possible to further prevent the monotonous development of the game. Incidentally, in a case that the moving velocity becomes excessively fast if rebounding according to a beat is set according to an interval between previous and subsequent operation timings and music, a rendition of rebounding according to the beat may be omitted.

In the above-described embodiments, the path along which the operation indication mark moves is provided between the operation reference portions. However, the present invention is not limited to this embodiment. For example, each path may extend up to both ends of the game region beyond each operation reference portion. In this case, for example, each operation indication mark moves to arrive at each operation reference portion at an operation timing described in the sequence data, and in the case in which an appropriate operation is not made on the operating unit when each operation indication mark arrives at the operation reference portion, the operation indication mark can be caused to move beyond the operation reference portion and collide with an end portion of the game region. In this case, preferably, a rebounding point is provided even on the end portion of the game region, and the position of the end portion of the game region at which the operation indication mark arrives serves as an appearance position of movement of a next operation indication mark. Further, in the above-described embodiments, the object 60 disappears at the arrival position when arrived, the arrival position serves as the appearance position of the object 60 corresponding to the operation timing indicated by the common object 60, and thus the object 60 moves as if the object 60 rebounds between the operation reference portions 55A and 55B. However, the movement of the object 60 is not limited to this embodiment. For example, the operation indication mark may not disappear each time when arrived at the rebounding point at the arrival position, and the operation indication mark may actually rebound from the rebounding point using the common object 60 as is. In this case, for example, after rebounding from the rebounding point, a color of the operation indication mark may be changed to a color corresponding to the operation reference portion to arrive next. Thus, information about the operation reference portion toward which the operation indication mark moves can be given.

In the above-described embodiments, a rectangular region is used as the game region 52, but the game region 52 is not limited to this embodiment. Regions of various shapes such as a polygonal shape and a circular shape may be used as the game region. Further, in the above-described embodiments, the two operation reference portions 55A and 55B respectively corresponding to both ends of the game region 52 in the longitudinal direction are provided, but the number of the operation reference portions is not limited to two (2). For example, a region in which three or more operation reference portions are set on the periphery thereof so that three or more players can play the game may be used as the game region.

In the above-described embodiments, the control unit 10 serving as the evaluating device performs an evaluation by comparing an operation timing of a touch operation with an operation timing described in sequence data, but may not have a function as the evaluating device. In this case, a game machine of a match-up type in which an operation is made in tune with a rhythm of music while inducing an opponent player to make a mistake can be implemented.

In the above-described embodiments, the touch panel is used as the input device, but the input device is not limited to this embodiment. For example, as far as a plurality of operating units are provided, there may be used input devices having various configurations such as a controller including a plurality of push buttons as the operating unit or a plurality of controllers each including one button as the operating unit. For example, when an input device including a direction selection button and an operation decision button is used as the input device, the operation decision button may be set so as to correspond to the operation reference portion, and a moving path of an operation indication mark used for movement to a next operation reference portion may be selected by the direction selection button.

In the above-described embodiments, the next operation timing $28cr$ is associated with information of a display start timing matching the previous operation timing $28cf$, but the present invention is not limited to this embodiment. A timing earlier than the certain operation timing $28cs$ may be set to the next operation timing $28cr$ as a display start timing. As a result, it is possible to extend a display period of an operation indication mark indicating the next operation timing $28cr$ in which an interval between operation timings is short.

Further, in the above-described embodiments, an operation timing is described as a timing described in the sequence data, but a display duration time may be described instead of an operation timing. In this case, an operation timing can be indicated by moving the object 60 so as to arrive at any operation reference portion at a timing in which a display duration time elapses from a display start timing.

Figure 23:
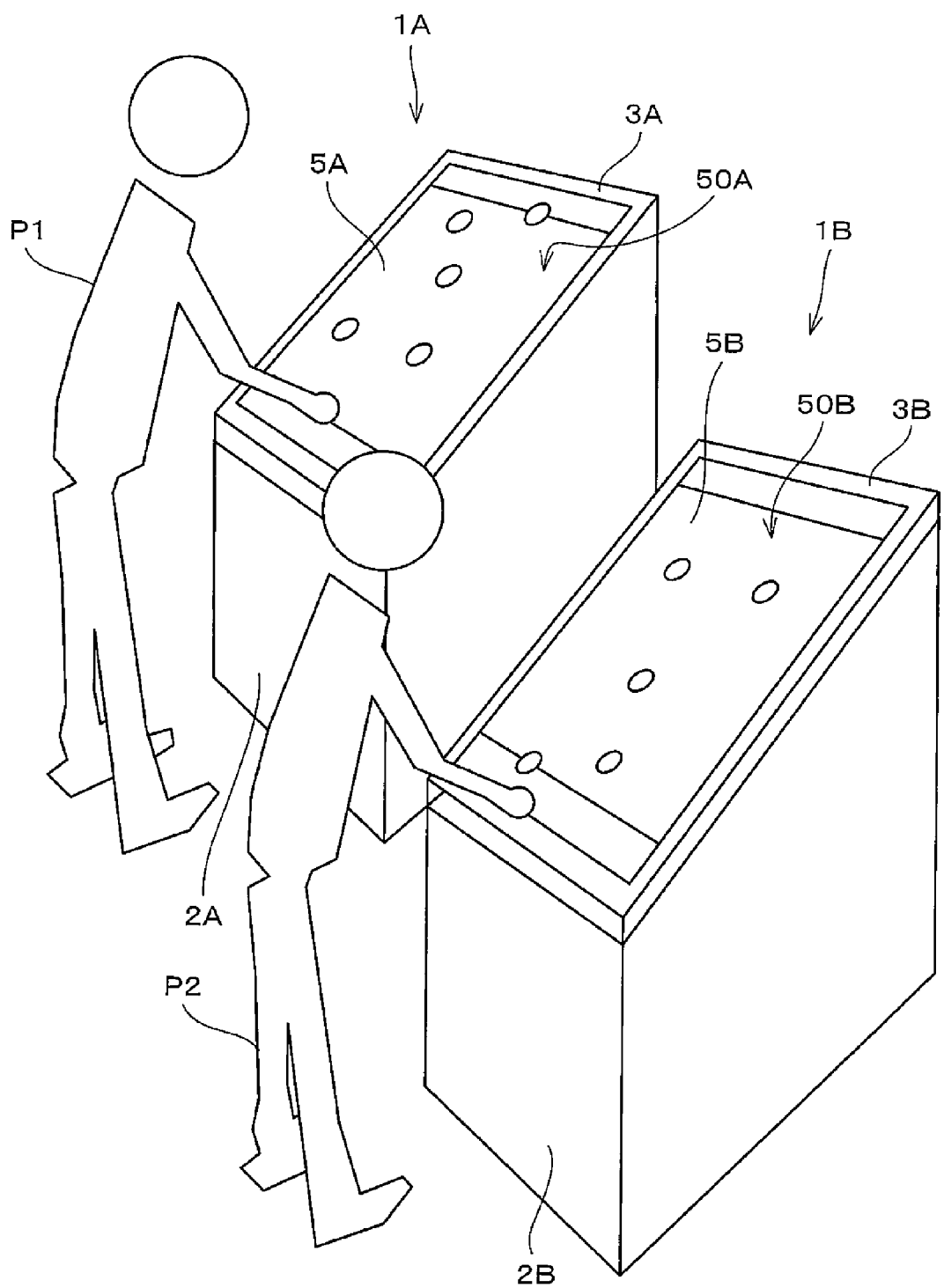
FIG. 23 is a diagram illustrating an example of a state in which two game machines 1A and 1B are connected to share game content.

In the above-described embodiments, only one game machine 1 is illustrated in FIG. 1, but a plurality of game machines 1 may be connected so as to share game content with each other. FIG. 23 is a diagram illustrating an example of a state in which two game machines 1A and 1B are connected so as to share game content. The example of FIG. 23 illustrates a case in which two game machines 1 each including a monitor 3 with a shallow slope are arranged side by side in a traverse direction. As illustrated in FIG. 23, in a monitor 3A used by one first player P1, a first operation reference portion 55A is arranged at a first player P1 side, whereas in a monitor 3B used by the other second player P2, a second operation reference portion 55B is arranged at a second player P2 side. In other words, a game screen 50A through which the first player P1 plays the game and a game screen 50B through which the second player P2 plays the game are arranged such that an upper portion and a lower portion thereof are reversed. And, the first player P1 uses the first operation reference portion 55A as the operating unit through a touch panel 5A superimposed on the monitor 3A, and the second player P2 uses the second operation reference portion 55B as the operating unit through a touch panel 5B superimposed on the monitor 3B. In this case, each of the first operation reference portion 55A of the first game machine 1A and the second operation reference portion 55B of the second game machine 1B functions as each of a plurality of operating units, respectively. Further, as an example similar to the example of FIG. 23, two game machines 1 may be arranged such that back sides are combined with each other, that is, two game machines 1 may be arranged back to back. In this case, the game is executed in a state in which the players are positioned to face each other, and thus each player's feeling that they are playing against each other can be further improved. Further, in the above-described embodiments, the monitor 3 is arranged so as to be inclined to the player P side, but the present invention is not limited to this embodiment. For example, the monitor may be arranged almost flatly. In this case, two players can use one monitor, and two players can use the first operation reference portion and the second operation reference portion as the plurality of operating units through the common monitor and the common touch panel.

Figure 24:
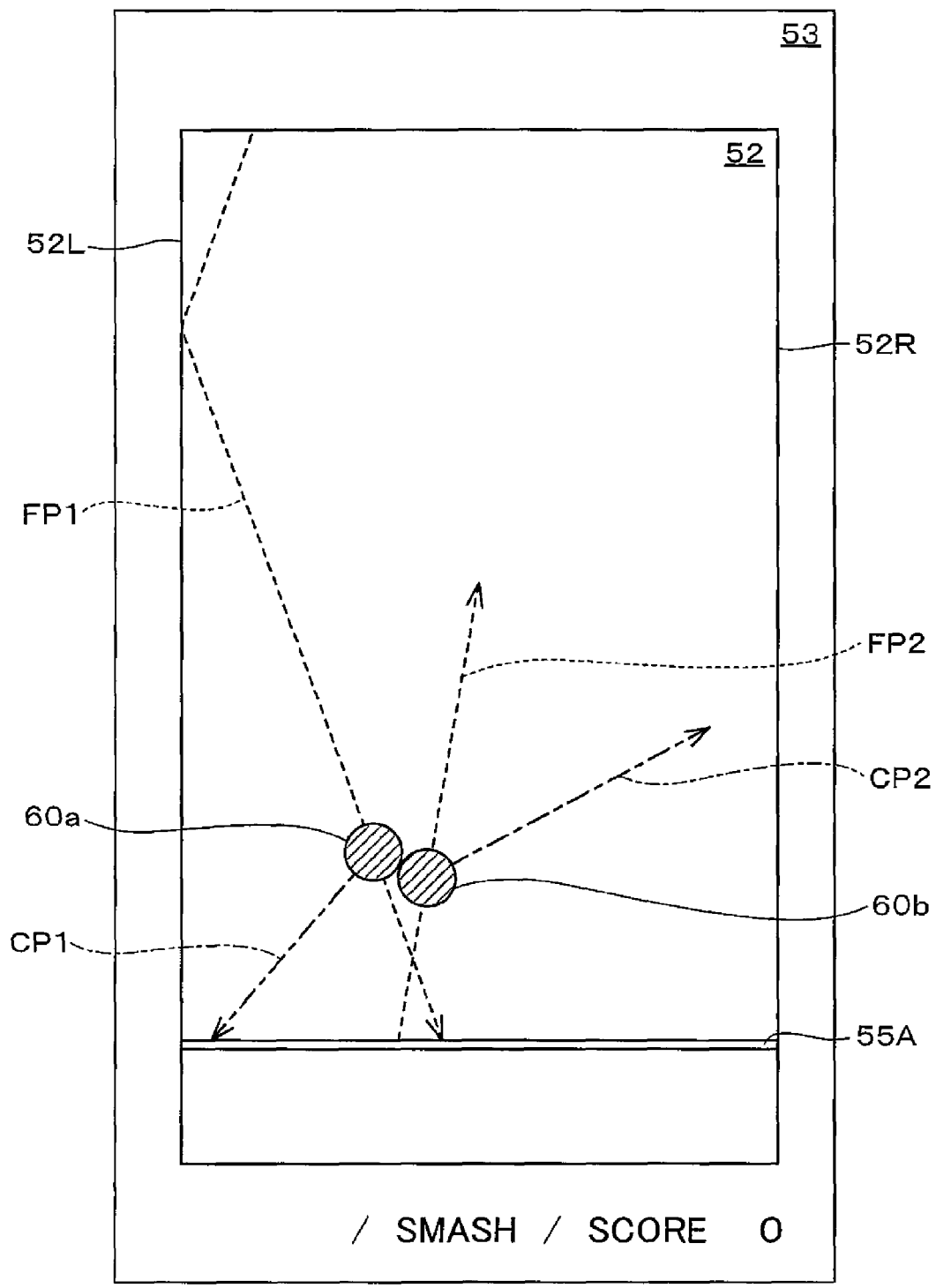
FIG. 24 is a diagram illustrating an example of a game screen including a display in which a moving direction of an object changes by a collision.

In the above-described embodiments, there are cases in which a plurality of operation indication marks is present on the game region. In this case, when the operation indication marks collide with each other, a display may be performed such that at least one of the moving direction and the moving velocity changes. In this case, for example, the moving direction of the operation indication mark can be naturally changed during movement. FIG. 24 is a diagram illustrating an example of a game screen including a display in which a moving direction of an object changes by a collision. In this example, a game screen through which a game is played by one player is used. As illustrated in FIG. 24, the second operation reference portion 55B is not provided on the game region 52 of this example. For this reason, an object serving as the operation indication mark moves to arrive at the first operation reference portion 55A at an operation timing described in sequence data while rebounding from walls around the game region 52. In the example of FIG. 24, two objects 60a and 60b are displayed on the game region 52. In FIG. 24, two dashed lines represent an expected path FP1 along which a first object 60a is expected to move and an expected path FP2 along which a second object 60b is expected to move. The first object 60a moves along the expected path FP1, rebounds from a wall positioned to face the first operation reference portion 55A, rebounds from a left side wall 52L again, and then moves up to the position immediately in front of the first operation reference portion 55A. Meanwhile, the second object 60b moves along the expected path FP2 from the first operation reference portion 55A toward a wall positioned to face the first operation reference portion 55A. And, in the example of FIG. 24, the two objects 60a and 60b collide with each other in front of the first operation reference portion 55A. Two alternate long and short dashed lines represent post-collision paths CP1 and CP2 in which each of the expected paths FP1 and FP2 has been changed by a collision. The path of the first object 60a is changed from the expected path FP1 to the post-collision path CP1 due to the collision, and thus the arrival position to the first operation reference portion 55A is changed. Further, since the post-collision path CP1 is longer in moving distance than the expected path FP1, the moving velocity is also changed. Similarly, the path of the second object 60b is changed from the expected path FP2 to the post-collision path CP2 due to the collision, and the moving distance is also changed. As described above, for example, the moving direction of the operation indication mark is changed during movement, and thus it is difficult to predict the moving path and the arrival position of the operation indication mark. Accordingly, a difficulty level of the game can be more variously changed.

Further, in the above-described embodiments, a configuration in which a moving path along which the object 60 moves to a next operation reference portion changes according to a predetermined condition such as an operation on the operating unit is provided, but this configuration may not be provided. Specifically, step S3 of the routine of FIG. 9, the routine of FIG. 10, and the like may not be performed.

In the above-described embodiments, the game machine 1 is configured as a music game machine in which music is reproduced, and the operation indication mark moves toward the operation reference portion based on a played time of the music. However, the invention is not limited to this embodiment. The game machine 1 can execute various kinds of games as far as an operation timing is indicated through a video. Furthermore, the game system of the invention may be actualized in appropriate embodiments such as a game machine for business use installed in commercial facility, a stationary game machine for home use, a portable game machine, or a game system actualized by using a network.

What is claimed is:

1. A game system comprising:
   a display device that displays and outputs a game screen;
   an input device including at least one operating unit;
   a sequence data storage device that stores sequence data in which a reference timing during a game is described;
   a game region presenting device that causes a game region in which a plurality of reference portions are set apart from each other to be displayed on the game screen of the display device; and
   a mark display control device that displays a first operation indication mark for indicating an operation on the operating unit while moving the operation indication mark in the game region such that the first operation indication mark arrives at one of the reference portions at a first reference timing designated by the sequence data, wherein
   the sequence data further includes display start information setting a display start timing of a second operation indication mark corresponding to a next reference timing when a time interval between the first reference timing and the next reference timing is less than a predetermined value, and
   the mark display control device starts to display the first operation indication mark and the second operation indication mark, the first operation indication mark being separate from the second operation indication mark corresponding to the first reference timing at the display start timing based on the sequence data corresponding to the next reference timing.

2. A game system comprising:
   a display device that displays and outputs a game screen;
   an input device including a plurality of operating units;
   a sequence data storage device that stores sequence data in which an operation timing on each of the plurality of operating units during a game is described in association with information indicating any one of the plurality of operating units;
   a game region presenting device that causes a game region in which a plurality of operation reference portions respectively corresponding to the plurality of operating units are set apart from each other to be displayed on a screen of the display device; and
   a mark display control device that displays a first operation indication mark for indicating an operation on the operating unit while moving the first operation indication mark in the game region such that the first operation indication mark arrives at one of the an operation reference portions at an associated first operation timing indicated by the sequence data, wherein
   the sequence data further includes display start information setting a display start timing of a second operation indication mark corresponding to a next operation timing to a timing earlier than the first operation timing when a time interval between the first operation timing and the next operation timing is less than a predetermined value, and the mark display control step further includes a step that starts to display the second operation indication mark separate from the first operation indication mark.

3. The game system according to claim 2, wherein a timing matching a display start timing of the previous operation indication mark corresponding to the previous operation timing before the first operation timing is set to the display start information of the sequence data as the display start timing of the second operation indication mark corresponding to the next operation timing.

4. The game system according to claim 2, wherein, in the display start information of the sequence data, in addition to the time interval between the first operation timing and the next operation timing, when a time interval between the first operation timing and a previous operation timing is less than the predetermined value, the start timings of the previous, first, and second operation indication marks are set to match a display start timing of the previous operation timing.

5. The game system according to claim 2, wherein a touch panel arranged on the display device so as to cover the game region is used as the input device.

6. The game system according to claim 2, wherein the game region presenting device causes a region which is formed in the form of a quadrangle, and includes two operation reference portions extending in the form of a straight line which are set at both one ends of the quadrangle so as to face with each other to be displayed on the screen of the display device as the game region.

7. The game system according to claim 2, further comprising an evaluating device that evaluates an operation in at least one operating unit based on a timing of an operation on the operating unit and an operation timing designated by the sequence data.

8. The game system according to claim 2, further comprising:
   an audio output device that reproduces and outputs a sound;
   a music data storage device that stores music data used to reproduce music; and
   a music reproducing device that reproduces the music through the audio output device based on the music data, and wherein
   an operation timing of each of the plurality of operating units during reproduction of the music is described in the sequence data.

9. A control method of controlling a computer incorporated into a game system including a display device that displays and outputs a game screen; an input device including a plurality of operating units; a sequence data storage device that stores sequence data in which an operation timing on each of the plurality of operating units during a game is described in association with information indicating any one of the plurality of operating units, wherein the control method of controlling the computer comprises the steps:
   a game region presenting step that causes a game region in which a plurality of operation reference portions respectively corresponding to the plurality of operating units are set apart from each other to be displayed on a screen of the display device; and
   a mark display control step that displays a first operation indication mark for indicating an operation on the operating unit while moving the first operation indication mark in the game region such that the first operation indication mark arrives at one of the operation reference portions corresponding to an operating unit at an associated operation timing indicated by the sequence data, wherein the sequence data further includes display start information setting a display start timing of a second operation indication mark corresponding to a next operation timing to a timing earlier than the first operation timing when a time interval between the first operation timing and the next operation timing is less than a predetermined value, and the mark display control step further includes a step that starts to display the second operation indication mark separate from the first operation indication mark.

* * * * *